United States Patent
Tanaka

(10) Patent No.: US 8,683,168 B2
(45) Date of Patent: Mar. 25, 2014

(54) MEMORY CARD INCLUDING A COMPUTING DEVICE FOR OBTAINING A PHYSICAL ADDRESS CORRESPONDING TO A LOGICAL ADDRESS AND COMPUTER SYSTEM INCLUDING THE MEMORY CARD

(75) Inventor: Shinji Tanaka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 316 days.

(21) Appl. No.: 12/644,616

(22) Filed: Dec. 22, 2009

(65) Prior Publication Data

US 2010/0161937 A1 Jun. 24, 2010

(30) Foreign Application Priority Data

Dec. 22, 2008 (JP) ................ 2008-325990

(51) Int. Cl.
*G06F 12/00* (2006.01)
*G06F 21/00* (2013.01)

(52) U.S. Cl.
USPC .............. 711/170; 711/E12.059; 711/6

(58) Field of Classification Search
None
See application file for complete search history.

(56) References Cited

U.S. PATENT DOCUMENTS

| | | | | |
|---|---|---|---|---|
| 5,146,571 A | * | 9/1992 | Logan | 714/6.13 |
| 2002/0015252 A1 | * | 2/2002 | Noble et al. | 360/72.1 |
| 2003/0225961 A1 | * | 12/2003 | Chow et al. | 711/103 |
| 2005/0149647 A1 | * | 7/2005 | Noble et al. | 710/33 |
| 2007/0159884 A1 | * | 7/2007 | Yoshida et al. | 365/185.09 |
| 2008/0201546 A1 | | 8/2008 | Tanaka | |
| 2008/0239548 A1 | * | 10/2008 | Paul et al. | 360/75 |

FOREIGN PATENT DOCUMENTS

| | | |
|---|---|---|
| JP | 7-36789 | 2/1995 |
| JP | 2007-334413 | 12/2007 |
| JP | 2008-204155 | 9/2008 |

OTHER PUBLICATIONS

Microsoft Computer Dictionary, Mar. 15, 2002, Microsoft Press, p. 25.*
Office Action issued Jun. 18, 2013 in Japanese Application No. 2008-325990 (With Partial English Translation).
U.S. Appl. No. 12/646,349, filed Dec. 23, 2009, Tanaka.

* cited by examiner

*Primary Examiner* — Sean D Rossiter
(74) *Attorney, Agent, or Firm* — Oblon, Spivak, McClelland, Maier & Neustadt, L.L.P.

(57) ABSTRACT

A memory system including a plurality of first blocks provided for storing user information therein, to which first physical addresses which are not duplicate are assigned, respectively, a plurality of second blocks provided for individually storing therein the first physical addresses of initial defective blocks out of the plurality of first blocks, and a plurality of third blocks provided for individually storing therein the first physical addresses of late defective blocks out of the plurality of first blocks. The memory system further includes a computing device for obtaining the first physical address corresponding to a logical address on the basis of the logical address, information stored in the second blocks, and information stored in the third blocks.

17 Claims, 18 Drawing Sheets

F I G . 1
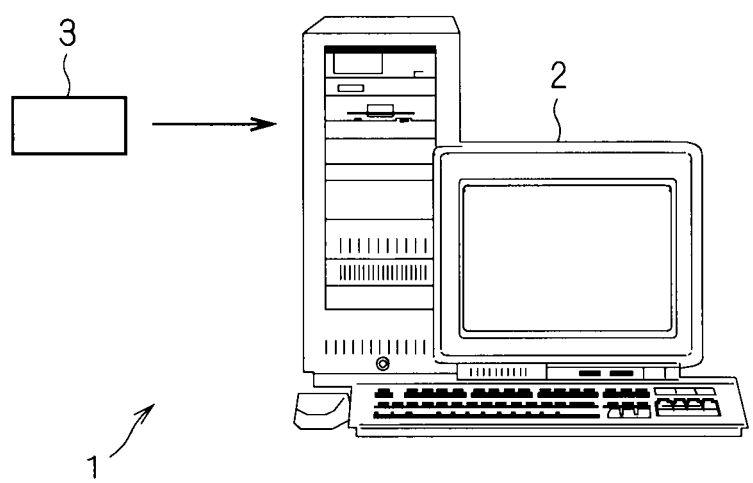

FIG. 5

| Physical Address | | |
|---|---|---|
| PBA0 | Good | 420 |
| PBA1 | Good | 420 |
| PBA2 | Good | 420 |
| PBA3 | Initial Bad | 421 |
| PBA4 | Good | 420 |
| PBA5 | Initial Bad | 421 |
| PBA6 | Good | 420 |
| PBA7 | Initial Bad | 421 |
| PBA8 | Good | 420 |
| PBA9 | Good | 420 |
| PBA10 | Good | 420 |
| PBA11 | Good | 420 |
| PBA12 | Good | 420 |
| PBA13 | Good | 420 |
| PBA14 | Good | 420 |
| PBA15 | Initial Bad | 421 |
| PBA16 | Good | 420 |
| PBA17 | Good | 420 |
| PBA18 | Good | 420 |
| PBA19 | Good | 420 |
| PBA20 | Initial Bad | 421 |
| PBA21 | Initial Bad | 421 |
| PBA22 | Good | 420 |
| PBA23 | Good | 420 |
| PBA24 | Good | 420 |
| PBA25 | Good | 420 |
| PBA26 | Good | 420 |
| PBA27 | Initial Bad | 421 |
| PBA28 | Good | 420 |
| PBA29 | Good | 420 |
| PBA30 | Good | 420 |
| PBA31 | Good | 420 |
| ⋮ | | |
| PBA(N-8) | Good | |
| PBA(N-7) | Good | |
| PBA(N-6) | Good | |
| PBA(N-5) | Good | |
| PBA(N-4) | Good | |
| PBA(N-3) | Good | |
| PBA(N-2) | Good | |
| PBA(N-1) | Good | |

(40; rows grouped into blocks 42)

F I G. 1 1 A
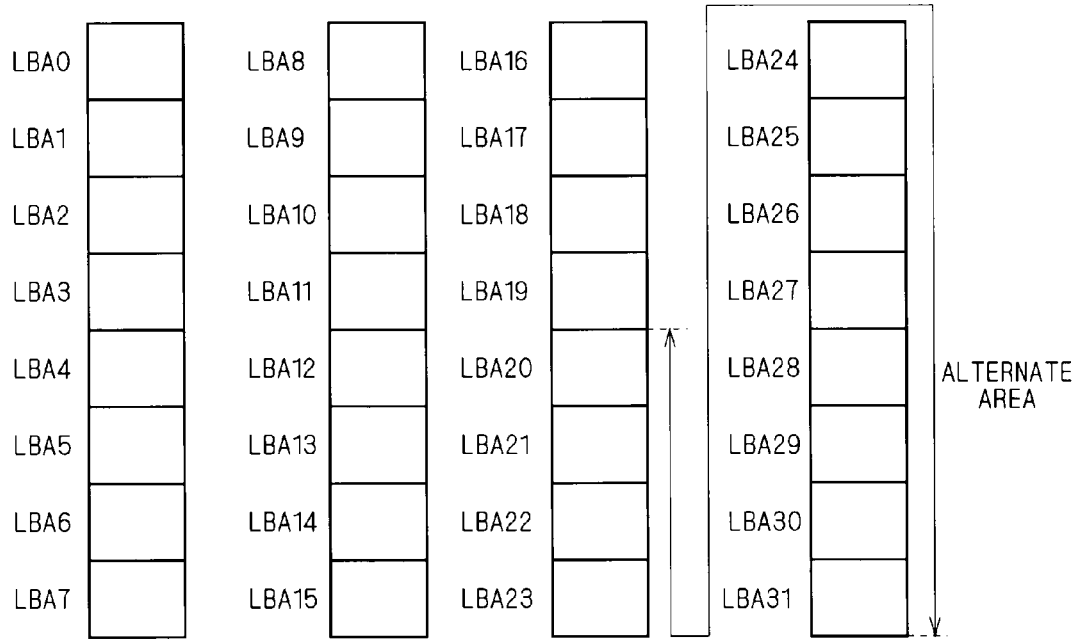
F I G. 1 1 B
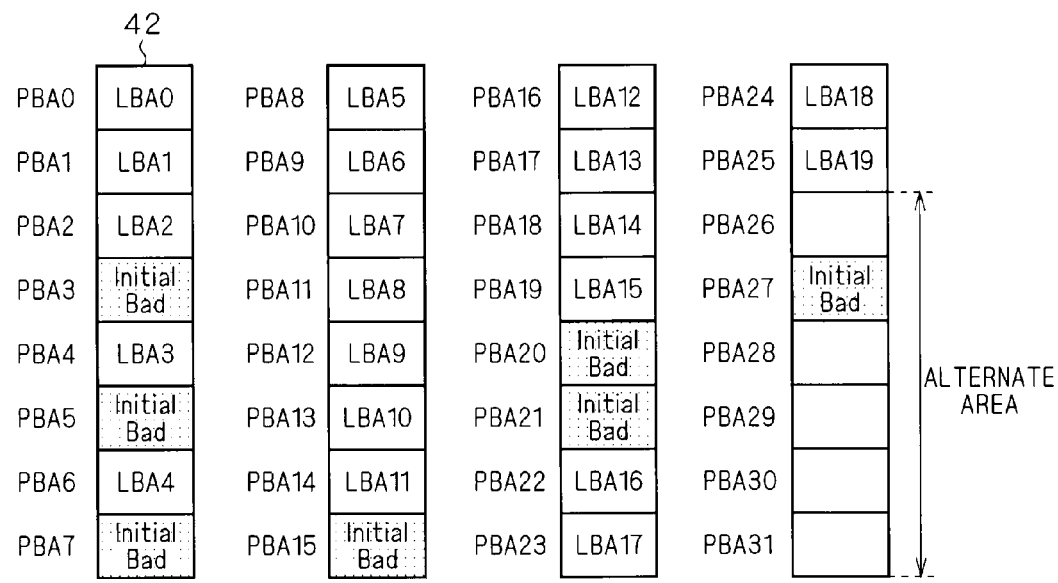

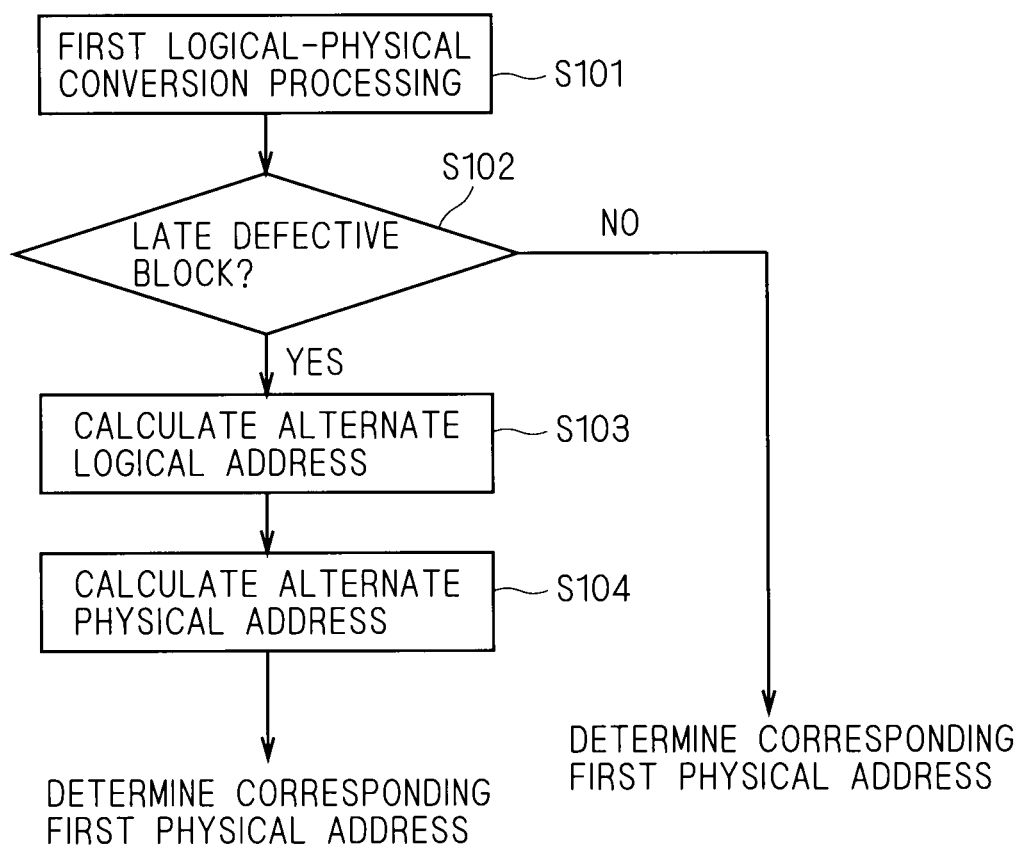

MEMORY CARD INCLUDING A COMPUTING DEVICE FOR OBTAINING A PHYSICAL ADDRESS CORRESPONDING TO A LOGICAL ADDRESS AND COMPUTER SYSTEM INCLUDING THE MEMORY CARD

BACKGROUND OF THE INVENTION

1. Field of the Invention

The present invention relates to a technique used for a memory storing data (user data) directly accessible to users, to reduce the capacity of a reserve storage area which does not directly stores the user data therein.

2. Description of the Background Art

In memories, generally, there also exist defective blocks and this hinders direct correspondence between logical addresses and physical addresses. For this reason, conventionally as to memories, known is a technique to provide a reserve storage area for storing information required for conversion between the logical addresses and the physical addresses.

As a method therefor, a reserve area is provided correspondingly to each data area (block) serving as a unit of access, to store characteristics information indicating whether the block is normal or defective therein. Then, at a predetermined timing (e.g., at power-on), a controller reads the characteristics information from all the reverse areas and makes a table indicating the correspondence between logical addresses and physical addresses. Alternatively, such a table may be held in a memory.

Further, a technique for suppressing the capacity of a reserve storage area required for the conversion between the logical addresses and the physical addresses without decreasing the access speed is disclosed in Patent Document 1 (Japanese Patent Application Laid Open Gazette No. 2008-204155).

In the technique of Patent Document 1, correlation between logical addresses and physical addresses is determined in such a manner as to associate the logical addresses in ascending order with the physical addresses in ascending order while skipping the physical addresses of defective blocks in a memory. Then, the physical addresses of the defective blocks are individually stored successively in ascending order into a plurality of second blocks in ascending order of the physical addresses thereof. In order to obtain a physical address from a logical address, a target block is searched for from the plurality of second blocks on the basis of the logical address and the physical address of the target block is added to the logical address.

In Patent Document 1, however, though the technique for the logical-physical conversion in a case where there exist initial defective blocks detected in a factory inspection is disclosed, no reference is made to the logical-physical conversion in a case where any defect occurs late in the memory during the use of the memory system.

Further, it is not desirable that the correspondence for logical-physical conversion should be changed over a lot of blocks when there occurs a late defective block (a defective block which occurs late).

SUMMARY OF THE INVENTION

It is an object of the present invention to provide a technique for eliminating the necessity of changing the correspondence for logical-physical conversion over a lot of blocks even if there occurs a late defect in a memory.

In order to achieve the above object, the present invention is intended for a memory system. According to a first aspect of the present invention, the memory system comprises a plurality of first blocks provided for storing user information therein, to which first physical addresses which are not duplicate are assigned, respectively, a plurality of second blocks provided for individually storing therein the first physical addresses of initial defective blocks out of the plurality of first blocks, a plurality of third blocks provided for individually storing therein the first physical addresses of late defective blocks out of the plurality of first blocks, and a computing device for obtaining the first physical address corresponding a logical address on the basis of the logical address, information stored in the second blocks, and information stored in the third blocks.

It is thereby possible to provide a memory system and a computer system each of which has no need to change the correspondence for logical-physical conversion over a lot of blocks even if there occurs a late defect in a memory.

According to a second aspect of the present invention, in the memory system of the first aspect, the third blocks are assigned third physical addresses which are not duplicate, respectively, and the first physical addresses of the late defective blocks to be stored in the third blocks are stored in the third blocks in the order of the third physical addresses in accordance with the order that late defects occur.

It is thereby possible to reduce the number of third blocks required to obtain the first physical addresses.

According to a third aspect of the present invention, in the memory system of the second aspect, the second blocks are assigned second physical addresses which are not duplicate, respectively, and the first physical addresses of the initial defective blocks to be stored in the second blocks are stored in the second blocks in the order of the second physical addresses in accordance with the order of the first physical addresses.

It is thereby possible to reduce the number of second blocks required to obtain the first physical addresses.

According to a fourth aspect of the present invention, in the memory system of the third aspect, the computing device (A) obtains the first physical address corresponding to the logical address on the basis of the logical address and the information stored in the second blocks, and (B) determines if the first physical address obtained in the step (A) agrees with any one piece of the information stored in the third blocks.

It is thereby possible to prevent access to the first physical address obtained in the step (A) and determine if a further logical-physical conversion should be performed.

According to a fifth aspect of the present invention, in the memory system of the fourth aspect, when said computing device determines in said step (B) that said first physical address agrees with one piece of said information stored in said third blocks, said computing device (C) obtains an alternate logical address on the basis of said third physical address of said third block which stores therein said first physical address obtained in said step (A) and a leading alternate logical address which is prepared in advance, and (D) obtains said first physical address corresponding to said logical address on the basis of said alternate logical address and said information stored in said second blocks.

It is thereby possible to achieve the first aspect of the present invention by an easy method.

According to a sixth aspect of the present invention, the memory system of the fifth aspect further comprises a first reserve block for storing the first physical address of the initial defective block out of the plurality of first blocks, a second reserve block for storing the first physical address of the late defective block out of the plurality of first blocks, and a transmission part for transmitting information stored in the first reserve block to the second block and transmitting information stored in the second reserve block to the third block.

It is thereby possible to transmit, for example, the information stored in the first and second reserve blocks as a backup to the second blocks and the third blocks in which high-speed computation can be performed by the computing device.

According to a seventh aspect of the present invention, in the memory system of the third aspect, the computing device (E) obtains the first physical address corresponding to the logical address on the basis of the logical address and the information stored in the second blocks, (F) makes access to the first block designated by the first physical address obtained in the step (E) and as the result thereof, determines if the first block is the late defective block, and (G) records the first physical address obtained in the step (E) into the leading one of the third blocks in which no information of the first physical address is stored when the first block is determined to be the late defective block in the step (F).

It is thereby possible to determine if a late defect occurs in the accessed first block and further determine if a further logical-physical conversion should be performed when access is made to the first physical address obtained in the step (E). It is further possible to dynamically perform the following logical-physical conversion on the basis of the information in the updated third block.

According to an eighth aspect of the present invention, in the memory system of the seventh aspect, the computing device (H) obtains an alternate logical address on the basis of the third physical address of the third block and a leading alternate logical address which is prepared in advance after the step (G), and (I) obtains the first physical address corresponding to the logical address on the basis of the alternate logical address and the information stored in the second blocks.

It is thereby possible to achieve the first aspect of the present invention by an easy method, i.e., by using the information in the updated third block.

According to a ninth aspect of the present invention, in the memory system of the fifth or eighth aspect, the computing device (J) determines if a first block designated by the first physical address obtained in the step (D) or the step (I) has a defect.

It is thereby possible to determine if a late defect occurs in the accessed first block and further determine if a further logical-physical conversion should be performed when access is made to the replaced first block.

According to a tenth aspect of the present invention, in the memory system of the ninth aspect, when the computing device determines that the first block has a defect, the computing device (K) records the first physical address obtained in the step (D) or the step (I) into the leading one of the second blocks in which no information of the first physical address is stored.

It is further possible to dynamically perform the following logical-physical conversion on the basis of the information in the updated second block. Further, in the second blocks after the recording, the first physical addresses are stored in ascending order, in accordance with the ascending order of the second physical addresses. This eliminates the necessity of sorting the information stored in the second blocks so that the first physical addresses can be stored in ascending order, in accordance with the ascending order of the second physical addresses.

According to an eleventh aspect of the present invention, in the memory system of the tenth aspect, the computing device (L) obtains the first physical address corresponding to the logical address on the basis of the alternate logical address obtained in the step (C) or the step (H) and information stored in the second block after the step (K).

It is thereby possible to achieve the first aspect of the present invention by an easy method, i.e., by using the information in the updated second block.

According to a twelfth aspect of the present invention, the memory system of the seventh or eleventh aspect further comprises a transmission part for transmitting the information of the second blocks to a first management area which is constituted of one part of the first blocks and transmitting the information of the third blocks to a second management area which is constituted of the other part of the first blocks.

It is thereby possible to store the information in the second and third blocks into the first and second management areas, respectively, as a backup.

According to a thirteenth aspect of the present invention, in the memory system of the twelfth aspect, the transmission part transmits the information of the first management area to the second blocks and transmits the information of the second management area to the third blocks before the computing device derives the first physical address corresponding to the logical address.

It is thereby possible to transmit, for example, the information stored in the first and second management areas as a backup to the second blocks and the third blocks in which high-speed computation can be performed by the computing device.

According to a fourteenth aspect of the present invention, in the memory system of the first aspect, the second blocks and the third blocks are held in a volatile memory.

The computing device can thereby make access to any one of the second blocks and the third blocks at high speed. Therefore, it is possible to increase the speed of the logical-physical conversion.

The present invention is also intended for a computer system. According to this aspect of the present invention, the computer system comprises a computer for generating a logical address, a memory having a plurality of first blocks provided for storing user information therein, to which first physical addresses which are not duplicate are assigned, respectively, a controller memory having a plurality of second blocks provided for individually storing therein the first physical addresses of initial defective blocks out of the plurality of first blocks, to which second physical addresses which are not duplicate are assigned, respectively, and a plurality of third blocks provided for individually storing therein the first physical addresses of late defective blocks out of the plurality of first blocks, to which third physical addresses which are not duplicate are assigned, respectively, and a computing device for obtaining the first physical address corresponding to the logical address received from the computer on the basis of the logical address, information stored in the second blocks, and information stored in the third blocks.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a computer system in accordance with the present invention;

FIG. 5 is a view showing an exemplary user information storage area;

FIGS. 11A and 11B are views used for explaining an operation of a logical-physical conversion process in accordance with a first preferred embodiment;

FIG. 12 is a flowchart showing the operation of the logical-physical conversion process in accordance with the first preferred embodiment;

DESCRIPTION OF THE PREFERRED EMBODIMENTS

Figure 2:
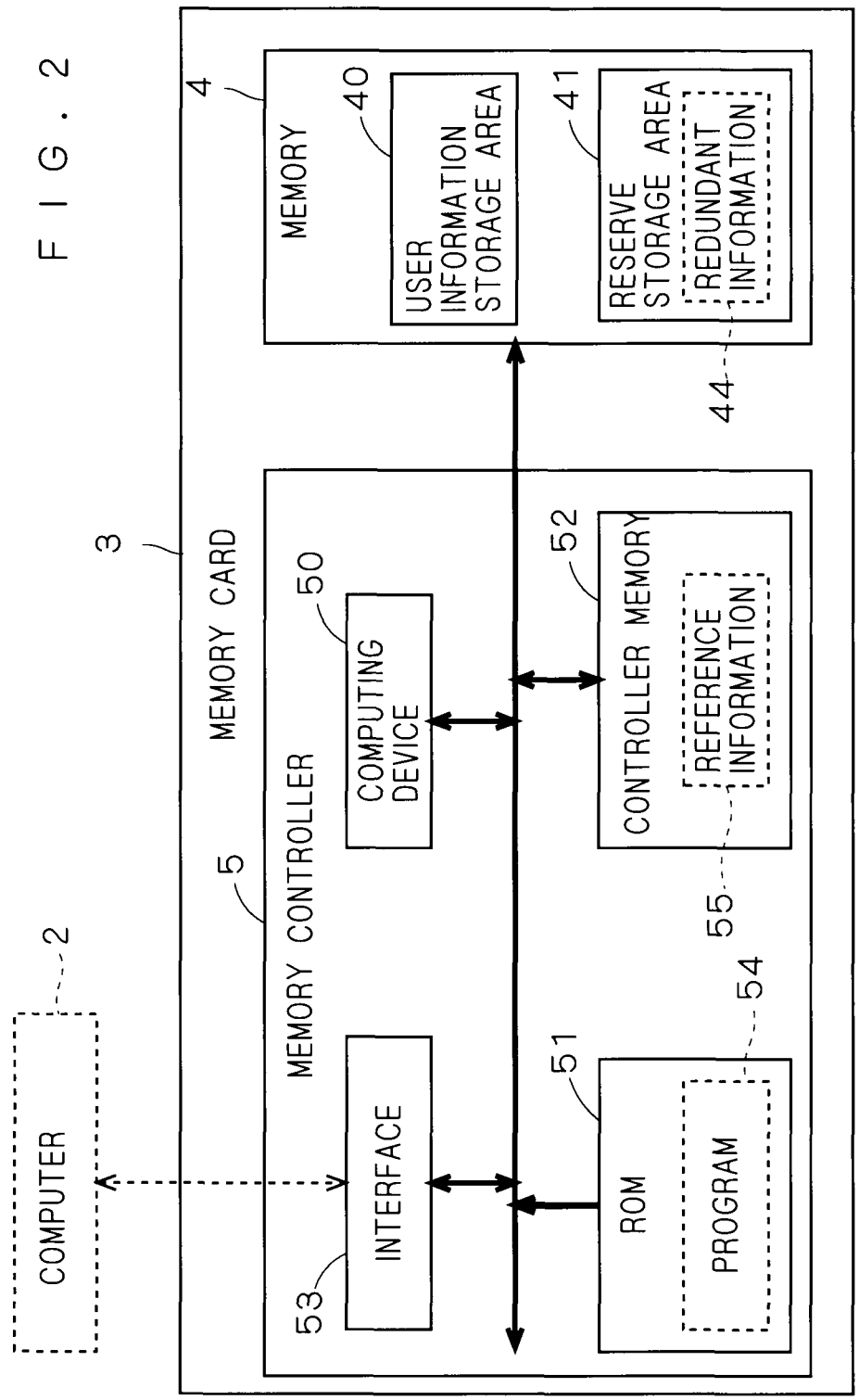
FIG. 2 is a block diagram showing a constitution of a memory card.

First, discussion will be made on the constitution and operation that are the premise on which the present invention is based (that is to say, the constitution and operation disclosed in Patent Document 1).

FIG. 1 is a view showing a computer system 1. The computer system 1 is constituted of a computer 2 having a function as a general-type personal computer and a memory card 3 which is inserted into a card slot of the computer 2. Logical addresses are transmitted between the computer 2 and a computing device 50 and physical addresses are transmitted between the computing device 50 and a memory 4.

The computer 2 operates, for example, in accordance with programs such as application software or the like stored in a memory device and sends an access request to the memory card 3 as necessary.

The access request discussed below refers to a write request for user data, a read request for user data stored in the memory card 3 (the memory 4 of FIG. 2), or the like. If the access request is a write request, the computer 2 generates a logical address indicating a writing position of user data to be written. If the access request is a read request, the computer 2 generates a logical address indicating a position in which user data to be read out is stored. The access request generated in the computer 2 includes a logical address and the computer 2 sends the access request to the memory card 3 through an interface.

FIG. 2 is a block diagram showing a constitution of the memory card 3. The memory card 3 comprises the memory 4 and a memory controller 5 for controlling the memory 4 and is detachable from the computer 2.

Figure 3:
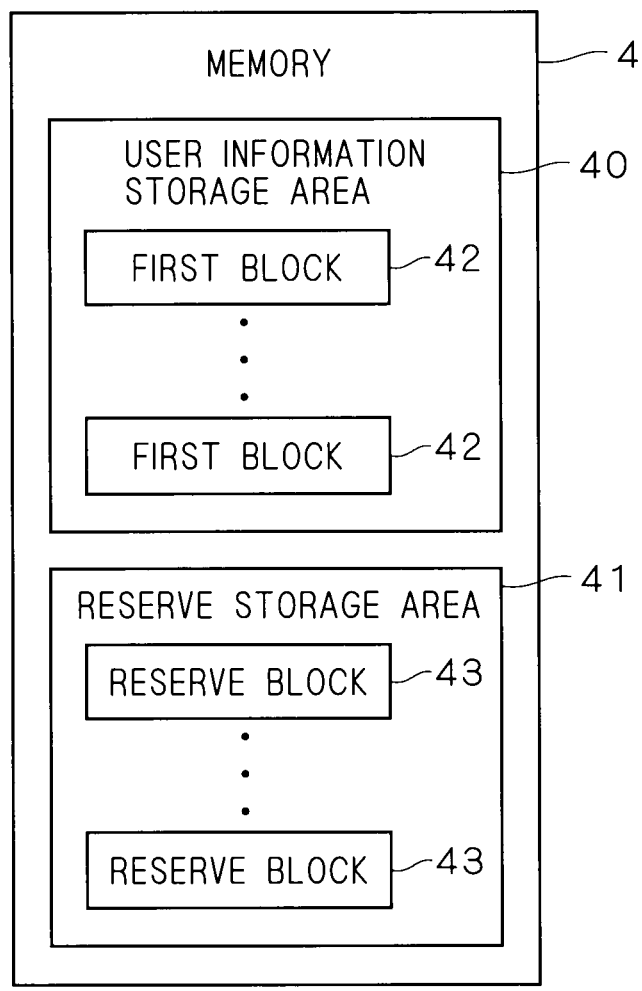
FIG. 3 is a schematic diagram showing an internal constitution of a memory.

FIG. 3 is a schematic diagram showing an internal constitution of the memory 4. As shown in FIG. 3, the memory 4 comprises a user information storage area 40 consisting of a plurality of first blocks 42 and a reserve storage area 41 consisting of a plurality of reserve blocks 43.

Figure 4:
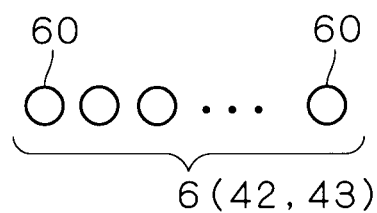
FIG. 4 is a view showing a structure of a block in the memory.

FIG. 4 is a view showing a structure of a block 6 (the first block 42 or the reserve block 43) in the memory 4. Each of a plurality of blocks 6 included in the memory 4, as shown in FIG. 4, consists of a plurality of memory elements 60 (a group of memory elements) and is a set of memory elements each of which is accessed with any one of physical addresses (the first physical addresses) which are not duplicate.

The number of memory elements 60 included in the first block 42 has only to be at least the number of memory elements 60 required to store user data specified by one physical address. In other words, the number of memory elements 60 depends on the capacity of user data to be read (or written) through one access.

The number of memory elements 60 included in the reserve block 43 has only to be at least the number of memory elements 60 required to store the physical address which designates one first block 42. In other words, the length (capacity) of physical address depends on the number of first blocks 42 included in the memory 4.

FIG. 5 is a view showing an example of the user information storage area 40. In this description, for example, the physical addresses in a specific physical address space (A) are generally referred to as a "physical addresses A" and the k-th physical address A out of the addresses is referred to as a "physical address Ak" (k is an integer not smaller than 0).

The user information storage are 40 is a storage area consisting of a plurality of (N) first blocks 42 (N is a natural number) as discussed above, and stores user data therein. To each of the first blocks 42, one of physical addresses PBA (PBA0 to PBA(N−1)) which are not duplicate is assigned. The physical address PBA in the memory 4 corresponds to the first physical address of the present invention.

The first blocks 42 formed in the memory 4 as a product, generally, include some blocks to which normal access can be made (normal blocks) and other blocks to which normal access can not be made (defective blocks). Since no access can be made to the defective blocks (which can not be used), no user data is stored in the defective blocks and no logical address is assigned thereto. As types of defects, there are an initial defect which has already occurred before the memory is used, e.g., at the time of factor shipment or the like and a late defect which occurs during the use of the memory 4.

For convenience of illustration, FIG. 5 shows a state where "Good" is stored as information in the normal blocks 420 and "Initial Bad" is stored as information in initial defective blocks 421 each having an initial defect. In an actual case, however, one unit for storing user data is defined as the first block 42, and the first block 42 does not store information indicating the state of the block therein. In this discussion until the first preferred embodiment, the defective block refers only to the initial defective block (in the discussions of the first, second, and third preferred embodiments, the defective block also includes a late defective block as well as the initial defective block).

Figure 6:
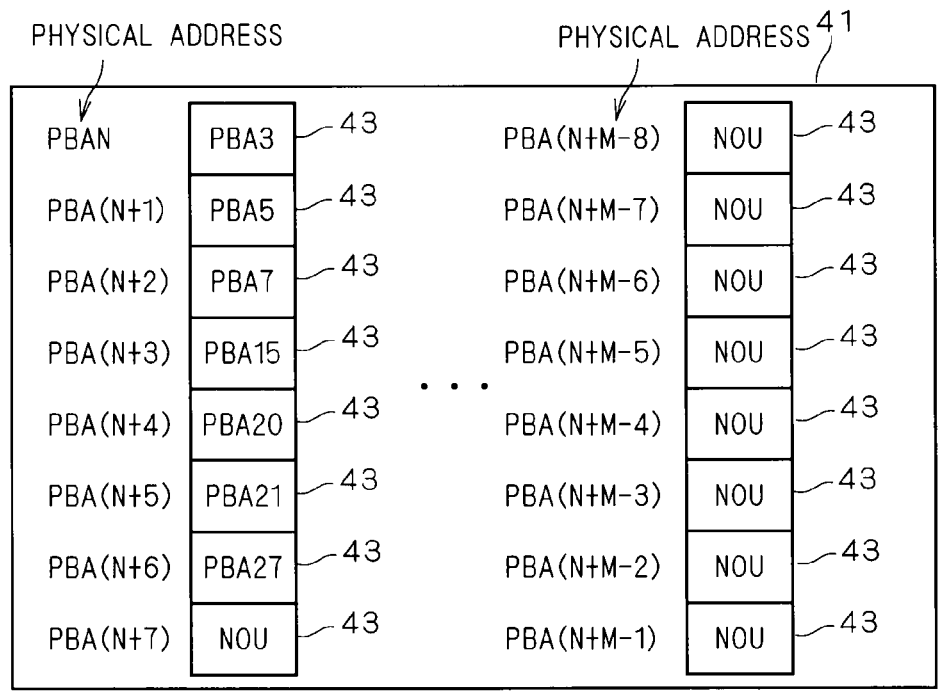
FIG. 6 is a view showing an exemplary reserve storage area.

FIG. 6 is a view showing an example of the reserve storage area 41 corresponding to the user information storage area 40 shown in FIG. 5. The reserve storage area 41 is a storage area consisting of a plurality of (M) reserve blocks 43, as discussed above, and stores redundant information 44 (see FIG. 2) therein. The redundant information 44 refers to information required for conversion of a logical address into a physical address performed by the memory controller 5 described later.

To each of the reserve blocks 43, assigned is any one of physical addresses PBA (PBAN to PBA(N+M−1)) in the memory 4. The physical address of the last first block 42 in the user information storage area 40 is a physical address PBA (N−1) and the physical address of the leading reserve block 43 in the reserve storage area 41 is a physical address PBAN. In other words, the user information storage area 40 and the reserve storage area 41 are allocated as contiguous storage areas, but naturally, allocation of the storage areas is not limited to this manner.

Some of the reserve blocks 43 each store invalid information ("NOU" in FIG. 6) indicating that the reserve block 43 is not used and others store the physical addresses PBA of the initial defective blocks 421 (physical addresses PBA3, PBA5, PBA7, PBA15, PBA20, PBA21, PBA27 in the exemplary case of FIG. 6). The information stored in the reserve block 43 has only to be information to acquire the physical address PBA of an initial defective block 421.

The initial defective block 421 is detected in an inspection process or the like for the memory 4, and the physical address PBA thereof is stored in any one of the reserve blocks 43. The physical addresses PBA of the detected initial defective blocks 421 are sequentially stored (in ascending order of the physical addresses PBA of the initial defective blocks 421) in the order that the memory controller 5 described later makes access to the reserve storage area 41 for readout (in ascending order of the physical addresses PBA of the reserve blocks 43). Further, when detection of all the initial defective blocks 421 is completed, the invalid information NOU is stored in the remaining reserve blocks 43.

Referring back to FIG. 2, the memory controller 5 comprises the computing device 50, a ROM 51 for storing programs 54, a controller memory 52 which is an SRAM, and an interface 53 for making a connection with the computer 2. The memory controller 5 makes access to the memory 4 in response to the access request received from the computer 2.

The computing device 50 of the memory controller 5 operates in accordance with the program 54 stored in the ROM 51 and obtains the physical address PBA of the first block 42 which is requested to be accessed from the logical address LBA included in the access request received from the computer 2 by computation on the basis of reference information 55 stored in the controller memory 52.

The computing device 50 performs computation of Eq. 1 by using the logical address LBA and an offset OFF to obtain the physical address PBA of the first block 42 which is requested to be accessed, though the operation thereof will be discussed later in detail.

$$PBA = LBA + OFF \qquad (Eq. 1)$$

The controller memory 52 (which is an SRAM) consists of memory elements (not shown) which can be accessed faster than the memory elements 60 constituting the block 6 in the memory 4 and stores the reference information 55 which is the redundant information 44 stored in the reserve storage area 41, after being transmitted. The reference information 55 stored in the controller memory 52 is referred to by the computing device 50. As the memory elements constituting the controller memory 52, nonvolatile memory elements are used in order to achieve high-speed access. As a volatile memory, a register, a flip flop circuit, or the like may be used as well as an SRAM.

Figure 7:
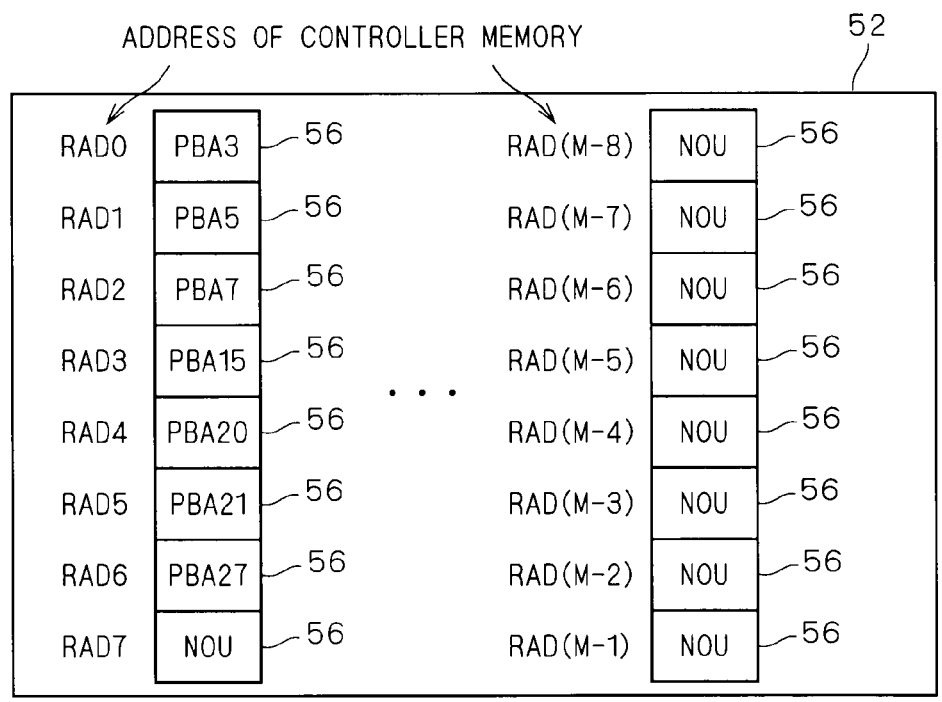
FIG. 7 is a view showing an exemplary state where redundant information is stored in a controller memory as reference information.

FIG. 7 is a view showing an exemplary state where the redundant information 44 shown in FIG. 6 is stored in the controller memory 52 as the reference information 55.

The controller memory 52 comprises a plurality of (M) second blocks 56 capable of individually storing information (the first physical addresses of the initial defective blocks out of the plurality of first blocks) stored in the reserve blocks 43. To the second blocks 56, assigned are physical addresses RAD (the second physical addresses) which are not duplicate.

In transmission of the redundant information 44 to the controller memory 52, the computing device 50 of the memory controller 5 makes access to the reserve blocks 43 sequentially in the order of the physical addresses PBA in the reserve storage area 41 and stores information (the physical addresses PBA of the initial defective blocks 421 or the invalid information NOU) stored in the reserve blocks 43 into the second blocks 56 in the order of the physical addresses RAD of the second blocks 56. In other words, the computing device 50 also has a function as a transmission part of the present invention. As can be seen from the above discussion, the reference information 55 is generated in the controller memory 52 as the same information as the redundant information 44.

With the reference information 55, the difference obtained by subtracting the physical address RAD of the second block 56 from the physical address PBA of the initial defective block 421 which is stored in the second block 56 indicates the number of normal blocks 420 (the number of first blocks other than the initial defective blocks) existing forward of the physical address PBA of the initial defective block 421 which is stored in the second block 56.

The interface 53 is provided for sending and receiving data to/from an interface of the computer 2.

Next, an operation of the computer system 1 will be discussed.

First, the memory controller 5 checks if the memory card 3 is powered on. The power-on of the memory card 3 refers to the start of power supply to the memory card 3 and includes the timing where the memory card 3 is inserted into the computer 2 which has been powered on.

When the memory controller 5 determined that the memory card 3 is powered on, the memory controller 5 (the computing device 50) makes access to the reserve storage area 41 of the memory 4 and reads the redundant information 44 out therefrom and starts transmission of the redundant information 44 which is read out to the controller memory 52. The information for the initial defective blocks shown in FIG. 6 are fixed for the product and stored in the memory 4 at the time of shipment.

The memory controller 5 sequentially makes access to the reserve blocks 43 which constitute the reserve storage area 41, ranging from the leading reserve block 43 to the last reserve block 43, and sequentially transmits the respective information stored in the reserve blocks 43 which are accessed to the second block 56. Thus, as shown in FIG. 7, the same information as that stored in the reserve storage area 41 shown in FIG. 6 are stored in the controller memory 52.

After that, it is assumed that the computer 2 generates an access request and sends the same to the memory card 3. The access request sent from the computer 2 includes a logical address LBA as discussed above. When the memory card 3 receives the access request (the logical address LBA), the computing device 50 obtains the physical address PBA by computation.

The computation will be discussed below. In the following discussion, the physical address RAD of the second block 56 which is specified by the computing device 50 is referred to as "index I" and the value read out from the second block 56 (the specified second block 56) designated by the index I is referred to as "RDV(I)". One of the second blocks 56, which is used to obtain the offset OFF, is referred to as "target block".

For computation of Eq. 1, the computing device 50 needs to determine the offset OFF. The computing device 50 obtains the offset OFF by computation through determining one target block with respect to one logical address LBA. In other words, the computing device 50 searches for the target block among a plurality of second blocks 56 included in the controller memory 52 on the basis of the logical address LBA, to thereby obtain the offset OFF.

First, the computing device 50 sets the index I to RAD0 (=0) and specifies the leading second block 56 to perform computation of Eq. 2.

$$RDV(I) - I = NUM \tag{Eq. 2}$$

Specifically, the value of NUM is obtained by subtracting the physical address RAD of the specified second block 56 designated by the current index I from the physical address PBA of the initial defective block 421 which is stored in the specified second block 56. This NUM indicates the number of normal blocks 420 (the number of the first blocks other than the initial defective blocks) existing forward of the initial defective block 421 designated by the physical address PBA stored in the specified second block 56.

Next, the computing device 50 determines whether Eq. 3 is true or false.

$$NUM > LBA \tag{Eq. 3}$$

If Eq. 3 is "True", the second block 56 designated by the index I (physical address RAD0) is determined as the target block.

On the other hand, if Eq. 3 is "False", there are various possible methods of searching for the target block among the plurality of second blocks 56. Herein, an exemplary case using a kind of binary search will be discussed.

First, "n" is set to a counter and the index I is updated so that one of the remaining second blocks 56 that are candidates for the target block, which is located at a center position, can be specified.

Herein, if there remain an even number of second blocks 56, one of the two second blocks 56 which are located at a center position, which has a larger physical address RAD, is specified as a central second block 56. In a case where there remain four candidate second blocks 56 which are designated by the physical addresses RAD0 to RAD3, for example, the central second block 56 is the second block 56 designated by the physical address RAD2.

When the index I is updated, the value of the counter is checked. If the value of the counter is larger than "1", the computing device 50 performs computation of Eq. 2 again and determines whether Eq. 3 is true or false.

If Eq. 3 is determined "True", the second block 56 designated by the index I and the second blocks 56 positioned backward thereof are excluded from the candidates for the target block and the counter is decremented. Then, the operation goes back to the above process of updating the index I.

On the other hand, if Eq. 3 is determined "False", the second block 56 designated by the index I and the second blocks 56 positioned forward thereof are excluded from the candidates for the target block and the counter is decremented. Then, the operation goes back to the above process of updating the index I.

Thus, if there are M ($2^n$) second blocks 56, by repeating the operation of excluding unnecessary second blocks 56 from the candidates for the target block (n−1) times, the candidate for the target block is narrowed to one.

Repeating the update process of the index I, when the value of the counter becomes "1" (the value of the counter becomes less than "1"), the computing device 50 performs computation of Eq. 2 and determines whether Eq. 3 is true or false. This determination on whether true or false means that it is determined whether the conversion-target first block 42 is an initial defective block 421 or not.

If Eq. 3 is determined to be "False", the index I is incremented in order to shift the conversion-target first block 42 backward by one and the second block 56 designated by the index I is determined as the target block.

If Eq. 3 is determined to be "True", the index I is not incremented since the conversion target is a normal block and the second block 56 designated by the index I is determined as the target block.

When the target block is determined, the computing device 50 performs computation of Eq. 1 with the index I (the physical address RAD designating the target block) used as the offset OFF to thereby obtain the physical address PBA.

Figure 8:
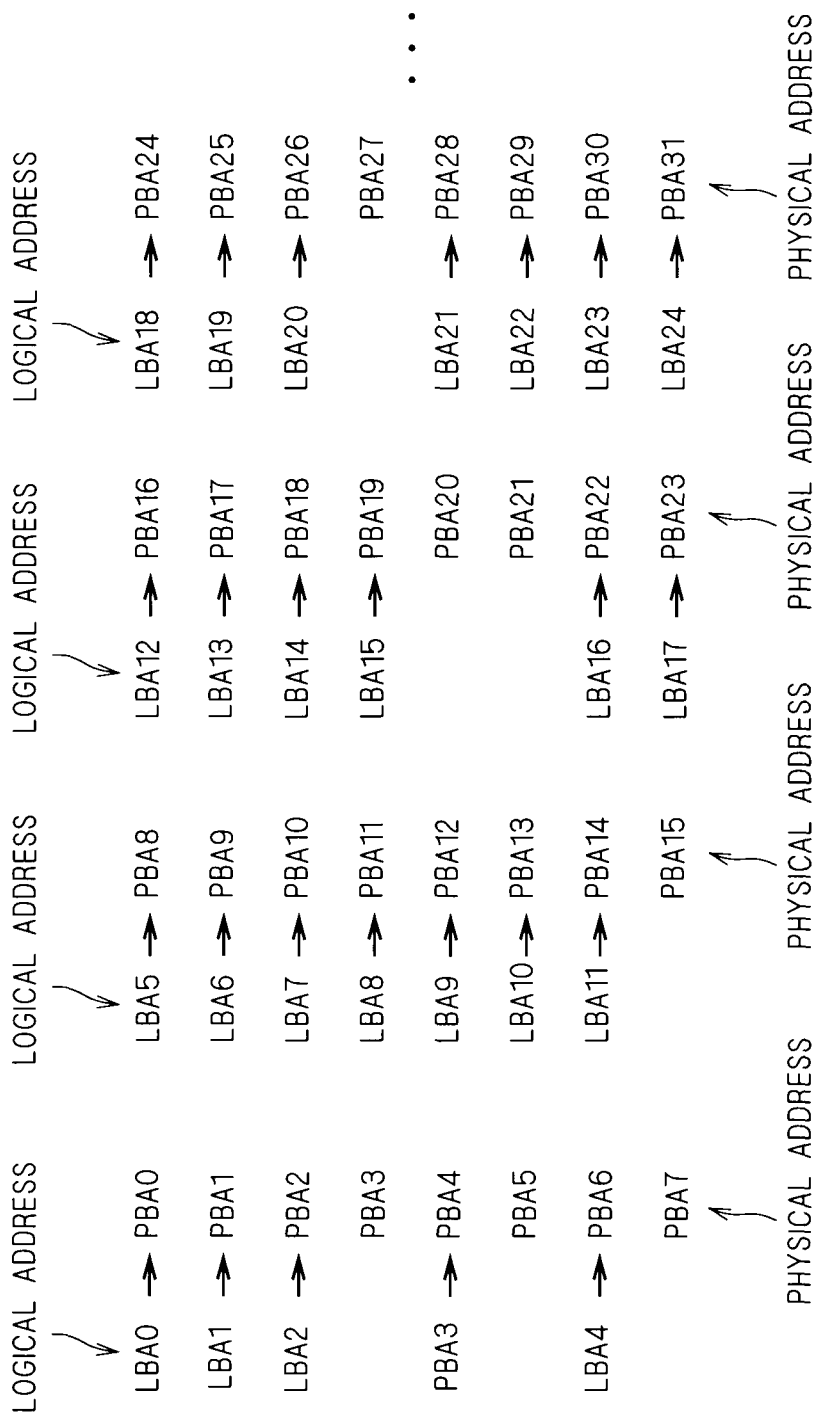
FIG. 8 is a view showing an exemplary correspondence between logical addresses and physical addresses.

FIG. 8 is a view showing an exemplary correspondence between the logical addresses and the physical addresses. FIG. 8 shows an exemplary case where there exist initial defective blocks 421 as shown in FIG. 5. As discussed above, since the physical address PBA is obtained from the logical address LBA, the relation of conversion shown in FIG. 8 is established in the computer system 1.

Herein, discussion will be made on an operation for obtaining the physical address PBA with respect to the logical address LBA5 in the case where there exist initial defective blocks 421 as shown in FIG. 5, assuming that N=32, M=$2^n$=$2^4$=16, as an example, First, when the logical address LBA5 is given, since Eq. 3 is determined to be "False", the above-discussed binary search is executed and n (=4) is set to the counter. Then, since $2^{4-1}+1=9$, the index I is set to "RAD($2^{4-1}$)" designating the 9-th second block 56 as the central second block 56.

In the physical address RAD($2^{4-1}$) (i.e., the physical address 8), NOU is stored. Herein, assuming that NOU is a sufficiently large number, NUM obtained by Eq. 2 is a sufficiently large number and Eq. 3 is determined to be "True". Therefore, the second block 56 designated by the physical address RAD8 and the second blocks 56 positioned backward thereof are excluded from the candidates for the target block and the value of the counter is decremented to "3".

Next, the index I is set to the center of the remaining candidates, i.e., "RAD4". At this time, the counter indicates "3" and the value of the counter, "3", is larger than "1". Therefore, the computing device 50 computes Eq. 2 again. It is found from Eq. 2 that NUM=16. Now, since the given logical address is "LBA5", Eq. 3 is determined to be "True" again. Therefore, the physical addresses RAD4 to RAD7 are excluded from the candidates, and the value of the counter is decremented to "2".

Next, the index I is set to the center of the remaining candidates, i.e., "RAD2". At this time, the counter indicates "2" and the value of the counter, "2", is larger than "1". Therefore, the computing device 50 computes Eq. 2 again. It is found from Eq. 2 that NUM=5. Now, since the given logical address is "LBA5", Eq. 3 is determined to be "False". Therefore, the physical addresses RAD0 to RAD2 are excluded from the candidates, and the value of the counter is decremented to "1".

Next, the index I is set to "RAD3". At this time, since the candidate is narrowed to one second block 56 designated by the address RAD3 and the counter indicates "1", it is found from Eq. 2 that NUM=12 and Eq. 3 is determined to be "True". Therefore, the physical address RAD3 is determined as the physical address of the target block and the offset OFF becomes "3".

Therefore, 5+3=8 from Eq. 1, and the logical address LBA5 is converted into the physical address PBA8. Specifically, it is found that the first block 42 accessed with the logical address LBA5 is the first block 42 designated by the physical address PBA8.

After the computing device 50 obtains the physical address PBA from the received logical address LBA, the memory controller 5 makes access to the memory 4 on the basis of the obtained physical address PBA.

At this time, if the access request is made for a write operation, the memory controller 5 controls the memory 4 to write user data into the first block 42 designated by the obtained physical address PBA. On the other hand, if the access request is made for a read operation, the memory controller 5 controls the memory 4 to read user data stored in the first block 42 designated by the obtained physical address PBA. The read-out user data is transmitted to the computer 2 through the interface.

The above discussion has been made on the logical-physical conversion in the case where there exist only initial defective blocks and no late defective block in the memory 4 (hereinafter, referred to as a "first logical-physical conversion" for explanatory convenience).

In the following preferred embodiments, discussion will be made on a logical-physical conversion in a case where there occur late defective blocks in the memory 4 after the shipment.

Hereinafter, the present invention will be specifically discussed with reference to figures showing the preferred embodiments.

<The First Preferred Embodiment>

Figure 9:
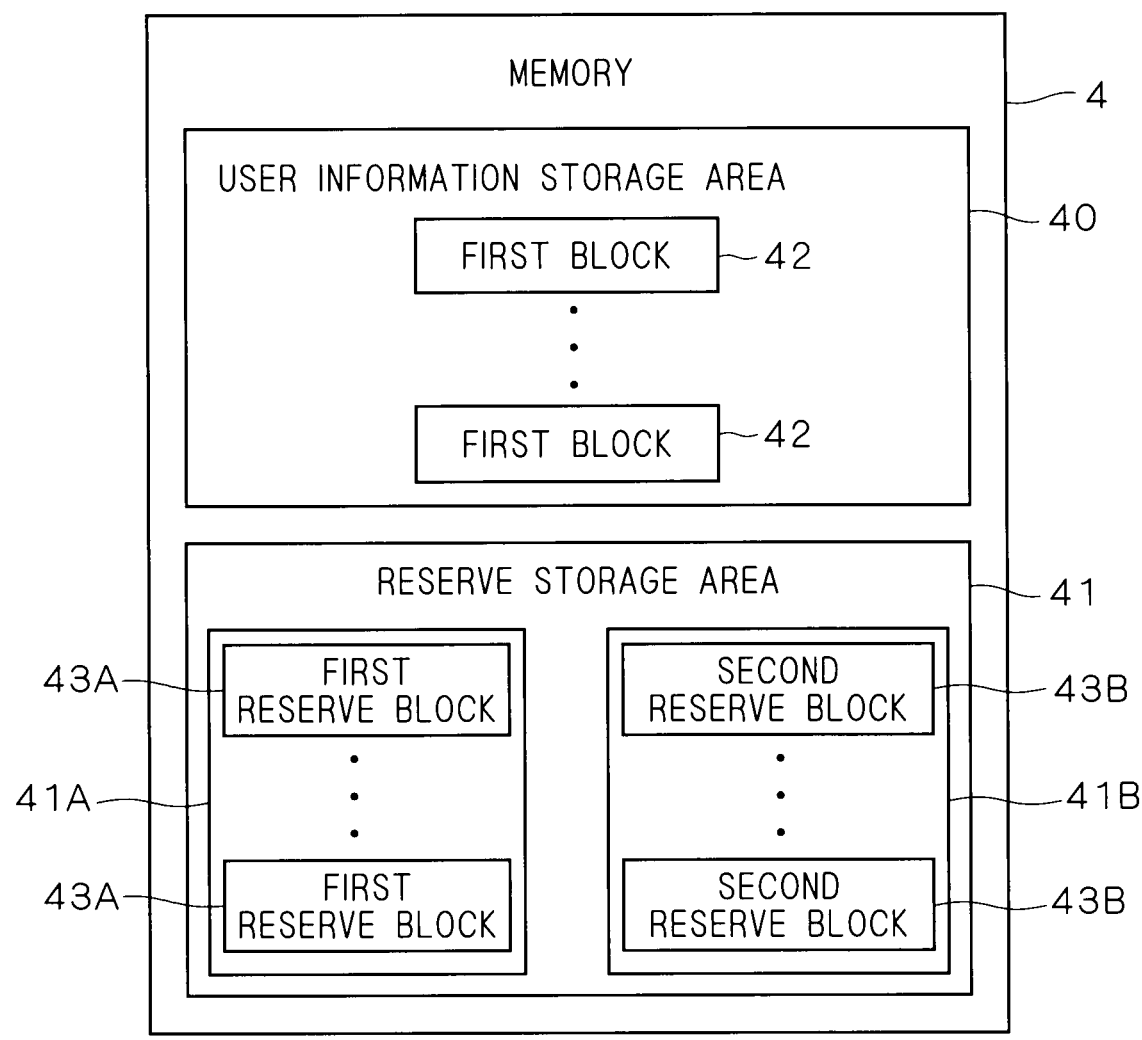
FIG. 9 is a schematic diagram showing an internal constitution of the memory.

FIG. 9 is a view showing a constitution of the memory 4 in accordance with the first preferred embodiment.

As shown in FIG. 9, the reserve storage area 41 of the memory 4 has two management areas 41A and 41B. The constitution of the user information storage area 40 shown in FIG. 9 is the same as that of the user information storage area 40 shown in FIG. 3. The first management area 41A shown in FIG. 9 is an area for storing and managing respective information on the first physical addresses of the initial defective blocks out of the first blocks 42 (see FIG. 6). The second management area 41B shown in FIG. 9 is an area for storing and managing respective information on the first physical addresses of the late defective blocks out of the first blocks 42.

In each of closed areas in the user information storage area 40 and the management areas 41A and 41B, a plurality of blocks 42, a plurality of blocks 43A, and a plurality of blocks 43B are provided, respectively, and in the closed areas, serial-numbered physical addresses are assigned to the blocks 42, 43A, and 43B, respectively. Herein, the blocks constituting the first management area 41A are first reserve blocks 43A and the blocks constituting the second management area 41B are second reserve blocks 43B.

To the first reserve blocks, assigned are serial-numbered physical addresses which are not duplicate. Also to the second reserve blocks, assigned are serial-numbered physical addresses which are not duplicate.

As discussed with reference to FIG. 6, the initial defective block is detected in an inspection process or the like for the memory 4, and the physical address thereof is stored in any one of the first reserve blocks 43A. The physical addresses of the detected initial defective blocks are sequentially stored (in ascending order of the physical addresses of the initial defective blocks) in the order that the memory controller 5 makes access to the reserve storage area 41 for readout (in ascending order of the physical addresses of the first reserve blocks 43A). In other words, as the physical address of the first reserve block 43A ascends, the (first) physical address of the initial defective block to be stored in the first reserve block 43A ascends. Further, when detection of all the initial defective blocks is completed, the invalid information NOU is stored in the remaining first reserve blocks 43A.

The late defective block is detected during the use of the memory 4, and the first physical address thereof is stored in any one of the second reserve blocks 43B. The physical addresses of the detected late defective blocks are sequentially stored (in ascending order of the physical addresses of the late defective blocks, which is the order that the late defects occur) in the order that the memory controller 5 makes access to the reserve storage area 41 for readout (in ascending order of the physical addresses of the second reserve blocks 43B). In other words, as the physical address of the second reserve block 43B ascends, the (first) physical addresses of the late defective blocks are stored in the second reserve blocks 43B in the order that the late defects occur. Further, after the late defective blocks are detected and stored, the invalid information NOU is stored in the remaining second reserve blocks 43B.

As to detection of the late defective blocks, for example, the memory controller 5 makes access to a predetermined first block 42 and when the memory controller 5 receives a signal from the memory 4, indicating that the read operation, the write operation, or the like is not normally completed as a result of the access, the memory controller 5 detects a late defective block. After the detection, the memory controller 5 records the first physical address of the predetermined first block into the second management area 41B of the memory 4 directly or through the controller memory 52.

Next, discussion will be made on an operation of a logical-physical conversion process after occurrence of the late defective block.

As discussed above, when the memory controller 5 determined that the memory card 3 is powered on, the memory controller 5 (the computing device 50) makes access to the reserve storage area 41 of the memory 4 and reads the redundant information 44 (information stored in the first and second management areas 41A and 41B) out therefrom and starts transmission of the redundant information 44 which is read out to the controller memory 52.

As discussed later, the information stored in the first management area 41A and the information stored in the second management area 41B are updated according to the condition of use of the memory 4 (specifically, the physical address of the defective block is recorded as occasion arises).

The memory controller 5 (the computing device 50) sequentially makes access to the first reserve blocks 43A which constitute the first management area 41A, ranging from the leading first reserve block 43A to the last first reserve block 43A, and sequentially transmits the respective information stored in the first reserve blocks 43A which are accessed to second blocks. With this operation, the same information as stored in the first management area 41A are stored in the controller memory 52 as the reference information 55. In other words, as the second physical address of the second block ascends, the (first) physical address of the initial defective block to be stored in the second block ascends.

The memory controller 5 (the computing device 50) sequentially makes access to the second reserve blocks 43B which constitute the second management area 41B, ranging from the leading second reserve block 43B to the last second reserve block 43B, and sequentially transmits the respective information stored in the second reserve blocks 43B which are accessed to third blocks. With this operation, the same information as stored in the second management area 41B are stored in the controller memory 52 as the reference information 55. In other words, as the third physical address of the third block ascends, the (first) physical address of the late defective block is stored into the third block in the order that the late defective block occurs in the memory 4.

Figure 10:
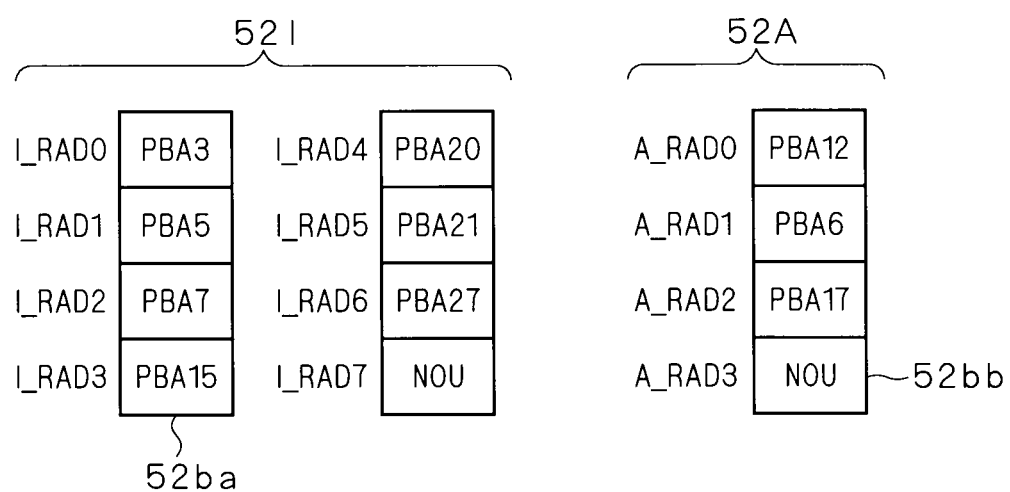
FIG. 10 is a view showing an exemplary structure of information stored in a first management area and a second management area as the reference information.

FIG. 10 is a view showing an exemplary state where the redundant information 44 is stored in the controller memory 52 as the reference information 55.

A first management area 52I in the controller memory 52 consists of a plurality of second blocks 52*ba*. In the first management area 52I, physical addresses (second physical addresses) of the second blocks 52*ba* in the controller memory 52 have serial numbers.

A second management area 52A in the controller memory 52 consists of a plurality of third blocks 52*bb*. In the second management area 52A, physical addresses (third physical addresses) of the third blocks 52*bb* in the controller memory 52 have serial numbers. To the second blocks, the second physical addresses I_RAD0 to I_RAD7 which are not duplicate are assigned, respectively. To the third blocks, the third physical addresses A_RAD0 to A_RAD3 which are not duplicate are assigned, respectively.

As can be seen from the above transmission process, the plurality of second blocks 52*ba* are provided for individually storing therein the first physical addresses of the initial defective blocks out of the plurality of first blocks 42. The plurality of third blocks 52*bb* are provided for individually storing therein the first physical addresses of the late defective blocks out of the plurality of first blocks 42.

As a result of the above transmission process, as illustrated in FIG. 10, as the second physical address of the second block 52*ba* ascends (I_RAD0→I_RAD1, . . . → I_RAD6→I_RAD7), the (first) physical address of the initial defective block to be stored in the second block 52*ba* ascends (PBA3→PBA5 . . . →PBA21→PBA27).

Further, as the third physical address of the third block 52*bb* ascends (A_RAD0→A_RAD1→A_RAD2→A_RAD3), the (first) physical address of the late defective block is stored into the third block 52*bb* in the order that the late defective block occurs in the memory 4. Therefore, it can be understood from FIG. 10 that a late defect occurs first in the first block 42 having the first physical address PBA12, a late defect subsequently occurs in the first block 42 having the first physical address PBA6, and a late defect occurs next in the first block 42 having the first physical address PBA17. In the unused blocks 52*ba* and 52*bb*, stored is the invalid information "NOU" indicating that the block is unused.

Now, it is assumed that after transmission of the information to the controller memory 52, the computer 2 generates an access request and transmits the same to the memory card 3. Herein, the access request sent from the computer 2 includes the logical address LBA as discussed above. When the memory card 3 receives the access request (the logical address LBA), the computing device 50 computes the first physical address PBA. The computation of the computing device 50 will be discussed with reference to FIGS. 10, 11A and 11B, and 12.

FIG. 11A is a view schematically showing a logical space. FIG. 11B is a view schematically showing a physical space before a late defective block occurs. In FIG. 11B, the user information storage area 40 of the memory 4 consists of 32 first blocks 42. To the first blocks 42, first physical addresses PBA0 to PBA31 are set in ascending order. In FIG. 11A, the (32) logical addresses LBA0 to LBA31 as many as the first blocks 42 are set in ascending order.

In the user information storage area 40 of the memory 4, user information are stored and in the exemplary case of FIG. 11A, the amount of data of the user information corresponds to the capacity of 20 first blocks 42. Therefore, in FIG. 11A, the logical addresses LBA0 to LBA19 for 20 blocks are set in ascending order. In FIG. 11A, the remaining logical addresses LBA20 to LBA31 are set as "alternate logical addresses" in ascending order. As can be seen from the above discussion, the boundary between some of the logical addresses LBA0 to LBA31 set in ascending order which belong to the alternate logical addresses and the others which do not belong thereto depends on the amount of data of the user information. An area to which the alternate logical addresses LBA20 to LBA31 belong is represented as "alternate area" in FIG. 11A.

On the other hand, in FIG. 11B, the user information storage area 40 consists of the normal blocks and the initial defective blocks. In FIG. 11B, for convenience of illustration, in each normal block seen is a corresponding logical address. In each of the initial defective blocks (PBA3, PBA5, PBA7, PBA15, PBA20, PBA21, and PBA27) seen are the letters "Initial Bad", for convenience of illustration. As a result of the above first logical-physical conversion, the correspondence between the first physical addresses and the logical addresses shown in FIG. 11B is established. To the first physical addresses, the logical addresses correspond in ascending order, skipping the initial defective blocks. In the normal blocks, the user information having the above amount of data are stored.

As shown in FIG. 11B, as a result of sequentially storing the user information in the normal blocks in ascending order of the first physical addresses, the first block 42 having the first physical address PBA25 becomes the end of the user information. Therefore, the first physical addresses PBA26 to PBA31 are set as the "alternate physical addresses" in ascending order. An area to which the alternate physical addresses PBA26 to PBA31 belong is represented as "alternate area" in FIG. 11B.

The first block 42 having the first physical address PBA27 is an initial defective block. Therefore, the first physical address PBA27 does not serve as an alternate physical address. As can be seen from the above discussion, the boundary between some of the first physical addresses PBA0 to PBA31 set in ascending order which belong to the alternate physical addresses and the others which do not belong thereto depends on the amount of data of the user information and the number of initial defective blocks (six in FIG. 11B) occurring in a range from the leading first block 42 to the first block 42 in which the last data of the user information is stored.

In accordance with the exemplary case shown in FIGS. 11A and 11B, in the second blocks 52ba of the first management area 52I shown in FIG. 10, the first physical addresses PBA3, PBA5, PBA7, PBA15, PBA20, PBA21, and PBA27 of the initial defective blocks are stored in ascending order.

Now, it is assumed that as a result of the use of the memory 4, the first blocks having the first physical addresses PBA12, PBA6, and PBA17 becomes late defective blocks in this order. In this case, as shown in FIG. 10, in the third blocks 52bb of the second management area 52A, the first physical addresses PBA12, PBA6, and PBA17 of the late defective blocks are stored in this order, i.e., in the order that the late defects occur.

The logical-physical conversion after occurrence of the late defective blocks will be discussed with reference to the flowchart of FIG. 12. Specifically, discussion will be made, with reference to FIG. 12, on the operation of the computing device 50 for obtaining a first physical address corresponding to a logical address on the basis of the logical address, the information stored in the second blocks 52ba, and the information stored in the third blocks 52bb.

It is assumed that the computer 2 sends an access request including the logical address LBA4 (e.g., a read request) to the memory card 3. In this case, the computing device 50 calculates the first physical address PBA6 corresponding to the logical address LBA4 by the above first logical-physical conversion using the logical address LBA4 and the information of the first management area 52I in the controller memory 52 (the information stored in the second blocks 52ba) (Step S101).

Next, the computing device 50 searches through the information in the second management area 52A of the controller memory 52. Specifically, the computing device 50 searches through the information in all the third blocks 52bb. Then, the computing device 50 checks if the information of the first physical address "PBA6" calculated in Step S101 is found in any one of the third blocks 52bb (Step S102). In other words, the computing device 50 determines if the first physical address obtained in Step S101 agrees with the information (the first physical address) stored in any one of the third blocks 52bb (Step S102).

Herein, if a small number of late defective blocks occur, the computing device 50 may search through all the third blocks 52bb. On the other hand, if a large number of late defective blocks occur, there may be a technique where an additional table is created e.g., at power-on or the like, in which the blocks in the second management areas are sorted in ascending order of the addresses thereof, and the binary search is executed in the additional table.

In the exemplary case of FIG. 10, at the third physical address A_RAD1 which is the second address in the second management area 52A, the first physical address PBA6 is stored. Therefore, the judgment is "YES" in Step S102 and the computing device 50 subsequently executes Step S103.

In Step S103, the computing device 50 calculates the alternate logical address from the following Eq. 11.

alternate logical address=leading alternate logical address+alternate logical offset (Eq. 11)

In the exemplary case of FIG. 11A, the leading alternate logical address (the leading address in the alternate area of FIG. 11A) is "LBA20", and this value is set in advance in the computer 2 and the memory card 3. The alternate logical offset is uniquely determined from the physical address (the third physical address) of the third block 52bb in the second management area 52A, in which the first physical address obtained in Step S101 is stored (determined uniquely from the value of serial number of the third physical address).

In a case, for example, where the first physical address obtained in Step S101 is stored in the leading third block 52bb, since the third physical address of the leading third block 52bb is "A_RAD0", the alternate logical offset is determined to be "0". In another case where the first physical address obtained in Step S101 is stored in the second third block 52bb, since the third physical address of the second third block 52bb is "A_RAD1", the alternate logical offset is determined to be "1". In still another case where the first physical address obtained in Step S101 is stored in the third third block 52bb, similarly, since the third physical address of the third third block 52bb is "A_RAD2", the alternate logical offset is determined to be "2".

In the above exemplary case, the first block 42 having the first physical address PBA6 is the second late defective block. Accordingly, as shown in FIG. 10, the first physical address "PBA6" obtained in Step S101 is stored in the third physical address A_RAD1 in the second management area 52A. Therefore, the alternate logical offset is determined to be "1".

From Eq. 11A, the alternate logical address=LBA20+1, and the computing device 50 obtains LBA21 as the alternate logical address ("21" is the sum of the number "20" of the leading alternate logical address and the value "1" of the alternate logical offset).

Next, the computing device 50 calculates the alternate physical address corresponding to the alternate logical address LBA21 by performing the above first logical-physical conversion (conversion of the alternate logical address, instead of the logical address) using the alternate logical address LBA21 obtained in Step S103 and the information in the first management area 52I of the controller memory 52 (the information stored in the second block 52ba) (Step S104). By applying the above first logical-physical conversion, the alternate physical address is determined to be "PBA28".

Then, the computing device 50 determines the alternate physical address PBA28 calculated in Step S104 as the first physical address corresponding to the inputted logical address LBA4.

Next, it is assumed that the computer 2 sends an access request including the logical address LBA5 (e.g., a read request) to the memory card 3. In this case, the computing device 50 calculates the first physical address PBA8 corresponding to the logical address LBA5 in Step S101.

As a result of the search in Step S102, it is found that no information of the first physical address PBA8 obtained in Step S101 exists in any one of all the third blocks 52bb constituting the second management area 52A. In this case, the judgment is "NO" in Step S102 and the computing device 50 determines the first physical address PBA8 calculated in Step S101 as the first physical address corresponding to the inputted logical address LBA5.

Further, it is assumed that the computer 2 sends an access request including the logical address LBA9 (e.g., a read request) to the memory card 3. In this case, the computing device 50 calculates the first physical address PBA12 corresponding to the logical address LBA9 in Step S101.

In the exemplary case of FIG. 10, at the third physical address A_RAD0 which is the first address in the second management area 52A, the first physical address PBA12 is stored. Therefore, the judgment is "YES" in Step S102 and the computing device 50 subsequently executes Step S103. In Step S103, the computing device 50 calculates the alternate logical address from Eq. 11. In this case, from Eq. 11, the alternate logical address=LBA20+0, and the computing device 50 obtains LBA20 as the alternate logical address ("20" is the sum of the number "20" of the leading alternate logical address and the value "0" of the alternate logical offset).

Next, the computing device 50 calculates the alternate physical address PBA26 corresponding to the alternate logical address LBA20 in Step S104. Then, the computing device 50 determines the alternate physical address PBA26 calculated in Step S104 as the first physical address corresponding to the inputted logical address LBA9.

Further, it is assumed that the computer 2 sends an access request including the logical address LBA13 (e.g., a read request) to the memory card 3. In this case, the computing device 50 calculates the first physical address PBA17 corresponding to the logical address LBA13 in Step S101.

In the exemplary case of FIG. 10, at the third physical address A_RAD2 which is the third address in the second management area 52A, the first physical address PBA17 is stored. Therefore, the judgment is "YES" in Step S102 and the computing device 50 subsequently executes Step S103. In Step S103, the computing device 50 calculates the alternate logical address from Eq. 11. In this case, from Eq. 11, the alternate logical address=LBA20+2, and the computing device 50 obtains LBA22 as the alternate logical address ("22" is the sum of the number "20" of the leading alternate logical address and the value "2" of the alternate logical offset).

Next, the computing device 50 calculates the alternate physical address PBA29 corresponding to the alternate logical address LBA22 in Step S104. Then, the computing device 50 determines the alternate physical address PBA29 calculated in Step S104 as the first physical address corresponding to the inputted logical address LBA13.

The memory controller 5 makes access to the first block 42 having the first physical address determined as above. As a result of the operation after occurrence of the late defective block discussed with reference to FIG. 12, the correspondence between the logical addresses and the first physical addresses shown in FIG. 13 is established.

Figure 13:
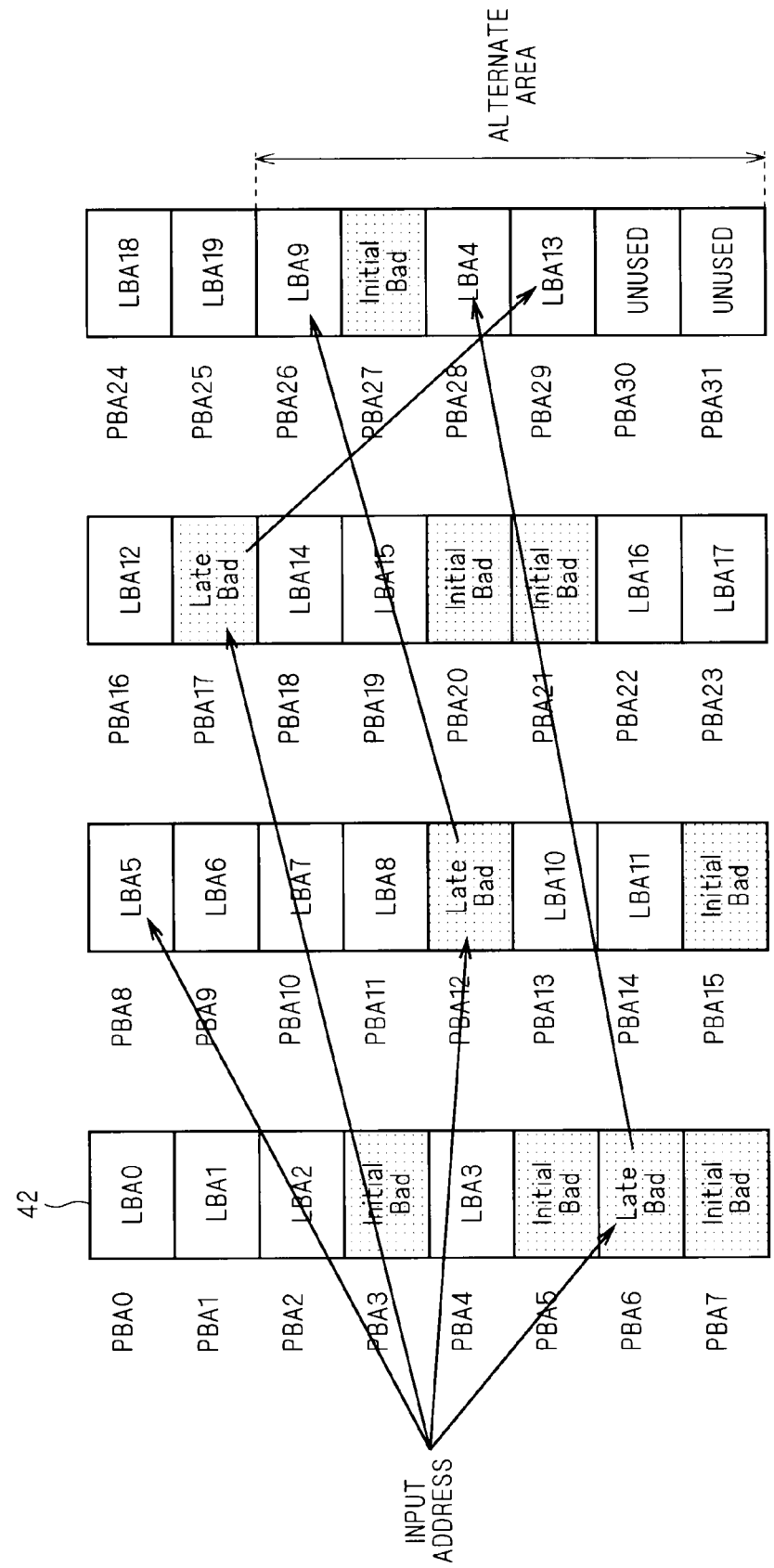
FIG. 13 is a view showing an exemplary correspondence between logical addresses and physical addresses.

In FIG. 13, for convenience of illustration, in each normal block seen is a corresponding logical address. In each of the initial defective blocks (PBA3, PBA5, PBA7, PBA15, PBA20, PBA21, and PBA27) seen are the letters "Initial Bad", for convenience of illustration. In each of the late defective blocks (PBA6, PBA12, and PBA17) seen are the letters "Late Bad", for convenience of illustration. Since the first blocks 42 having the alternate addresses PBA30 and PBA31, respectively, are unused, the letters "UNUSED" are seen in these first blocks 42, for convenience of illustration.

Thus, in the first preferred embodiment, the computing device 50 obtains the first physical addresses PBA0 to PBA31 corresponding to the inputted logical addresses LBA0 to LBA31, respectively, on the basis of the logical addresses, the information stored in the second blocks 52*ba*, and the information stored in the third blocks 52*bb*. Herein, the third blocks 52*bb* are provided for individually storing therein the first physical addresses PBA0 to PBA31 of the late defective blocks.

Therefore, even if a late defect occurs in the memory 4, it is possible to provide a memory system and the computer system 1 each of which has no need to change the correspondence for logical-physical conversion over a lot of blocks.

In the first preferred embodiment, the first physical addresses PBA0 to PBA31 of the initial defective blocks to be stored in the second blocks 52*ba* are stored in the second blocks 52*ba* in the order of the second physical addresses I_RAD0 to I_RAD7 in accordance with the order of the first physical addresses PBA0 to PBA31.

Therefore, it is possible to reduce the number of second blocks 52*ba* required to obtain the first physical addresses PBA0 to PBA31.

Further, in the first preferred embodiment, the first physical addresses PBA0 to PBA31 of the late defective blocks to be stored in the third blocks 52*bb* are stored in the third blocks 52*bb* in the order of the third physical addresses A_RAD0 to A_RAD3 in accordance with the order that the late defects occur.

Therefore, it is possible to reduce the number of third blocks 52*bb* required to obtain the first physical addresses PBA0 to PBA31.

In the first preferred embodiment, the memory controller 50 searches for the target block, obtains the number of first blocks 42 other than the initial defective blocks, which exist forward of the first physical address (PBA0 to PBA31) of the initial defective block which is read out from the target block on the basis of the first physical address (PBA0 to PBA31) of the initial defective block which is read out from the target block and the second physical address (I_RAD0 to I_RAD7) of the target block, and obtains the first physical address (PBA0 to PBA31) corresponding to the inputted logical address (LBA0 to LBA31) on the basis of the logical address and the obtained number.

Therefore, it is not necessary to store the first physical addresses PBA0 to PBA31 of the normal first blocks. Alternatively, it is not necessary to store the characteristics (defective or not) of all the blocks and the physical addresses of the transmission targets. Therefore, it is possible to reduce the number of second blocks 52*ba*.

In the first preferred embodiment, the computing device 50 determines if the first physical address (PBA0 to PBA31) obtained in Step S101 agrees with the any one piece of information stored in the third blocks 52*bb* (Step S102).

Therefore, it is possible to prevent access to the obtained first physical address (PBA0 to PBA31) and determine if a further logical-physical conversion should be performed.

In the first preferred embodiment, the computing device 50 obtains the alternate logical address (LBA20 to LBA31) on the basis of the third physical addresses A_RAD0 to A_RAD3 of the third blocks 52*bb* and the leading alternate logical address (herein, LBA20) prepared in advance (Step S103). Then, the computing device 50 obtains the first physical address (PBA0 to PBA31) corresponding to the inputted logical address on the basis of the alternate logical address (LBA20 to LBA31) and the information stored in the second blocks 52*ba* (Step S104).

Therefore, even if a late defect occurs in the memory 4, it is possible to provide the memory system and the computer system 1 by an easy method, each of which has no need to change the correspondence for logical-physical conversion over a lot of blocks.

In the first preferred embodiment, provided is the computing device (transmission part) 50 for transmitting the information stored in the first reserve blocks 43A to the second blocks 52*ba* and the information stored in the second reserve blocks 43B to the third blocks 52*bb*.

Therefore, it is possible to transmit, for example, the information stored in the first and second reserve blocks 43A and 43B as a backup to the second blocks 52*ba* and the third blocks 52*bb*, respectively, in which high-speed computation can be performed by the computing device 50.

In the first preferred embodiment, the second blocks 52*ba* and the third blocks 52*bb* are held in the controller memory 52 which is a volatile memory (e.g., an SRAM, a register, a flip flop circuit, or the like).

The computing device 50 can thereby make access to the second blocks 52*ba* and the third blocks 52*bb* at high speed. Therefore, it is possible to increase the speed of the logical-physical conversion.

<The Second Preferred Embodiment>

Now, the computer 2 sends an access request related to a delete operation or a write operation on a predetermined first block 42 in the memory 4 to the memory card 3. The access request includes a predetermined logical address and the computing device 50 calculates a first physical address corresponding to a predetermined inputted logical address discussed in the first preferred embodiment. Then, the memory controller 5 makes access to the calculated first physical address. When the access is made, the predetermined first block 42 may be a late defective block.

The second preferred embodiment is achieved in consideration of the above situation. Hereinafter, discussion will be made on conversion between a logical address and a first physical address in accordance with the second preferred embodiment.

As discussed above, determining that the memory card 3 is powered on, the memory controller 5 (the computing device 50) makes access to the reserve storage area 41 of the memory 4, reads the redundant information 44 (the information stored in the first and second management areas 41A and 41B) stored therein, and starts transmitting the read-out redundant information 44 to the controller memory 52. Specifically, as discussed in the first preferred embodiment, before deriving the first physical address corresponding to the inputted logical address, the computing device 50 transmits the information in the first management area (represented by 41A in FIG. 9) to the second block (represented by 52*ba* in FIG. 14) and transmits the information in the second management area (represented by 41B in FIG. 9) to the third block (represented by 52*bb* in FIG. 14). After the transmission discussed in the first preferred embodiment, the information shown in FIG. 14 are stored in the first management area 52I and the second management area 52A of the controller memory 52.

Figure 14:
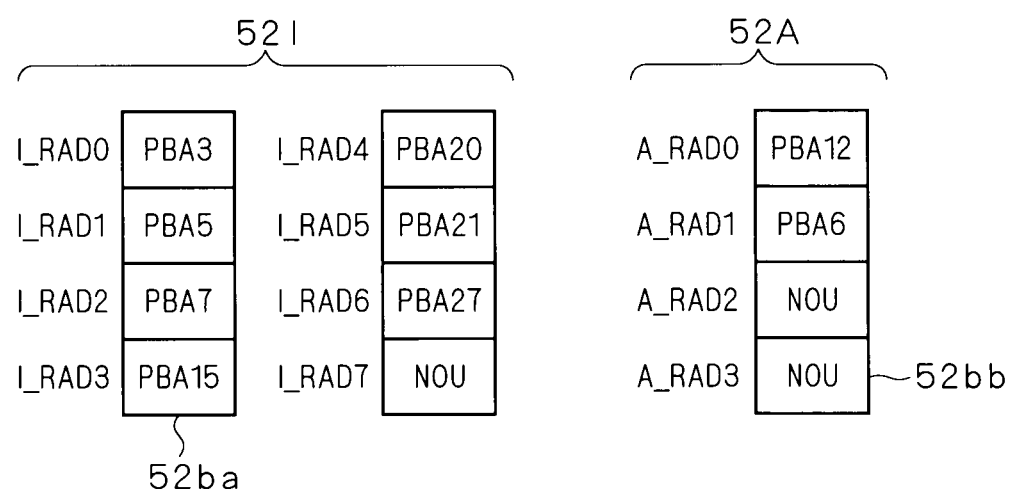
FIG. 14 is a view showing an exemplary structure of information stored in the first management area and the second management area as the reference information.

The structure of the first management area 52I shown in FIG. 14 and the information stored in the first management area 52I are the same as those shown in FIG. 10. In contrast, the second management area 52A shown in FIG. 14 consists of the third blocks 52*bb* like that of FIG. 10 but the information stored in the third blocks 52*bb* of the second management area 52A shown in FIG. 14 is different from that in the second management area 52A shown in FIG. 10. Specifically, late defects have already occurred in only the first blocks 42 designated by the first physical addresses PBA12 and PBA6 in this order.

After the above transmission of the information to the controller memory 52, it is assumed that the computer 2 generates an access request (a delete request or a write request) and sends the same to the memory card 3. Herein, the access request sent from the computer 2 includes a logical address LBA13. When the memory card 3 receives the access request (the logical address LBA13), the computing device 50 obtains the physical address by computation. Specifically, the computing device 50 performs the above first logical-physical conversion using the logical address LBA13, the information in the first management area 52I of the controller memory 52 (the information stored in the second blocks 52*ba*), to calculate the first physical address PBA17 corresponding to the logical address LBA13 (see Step S101).

As a result of the search in Step S102, no information of the first physical address PBA17 obtained in Step S101 is found in any one of the third blocks 52*bb* constituting the second management area 52A shown in FIG. 14. In this case, the judgment is "NO" in Step S102 and the computing device 50 determines the first physical address PBA17 calculated in Step S101 as the first physical address corresponding to the inputted logical address LBA13.

Figure 15:
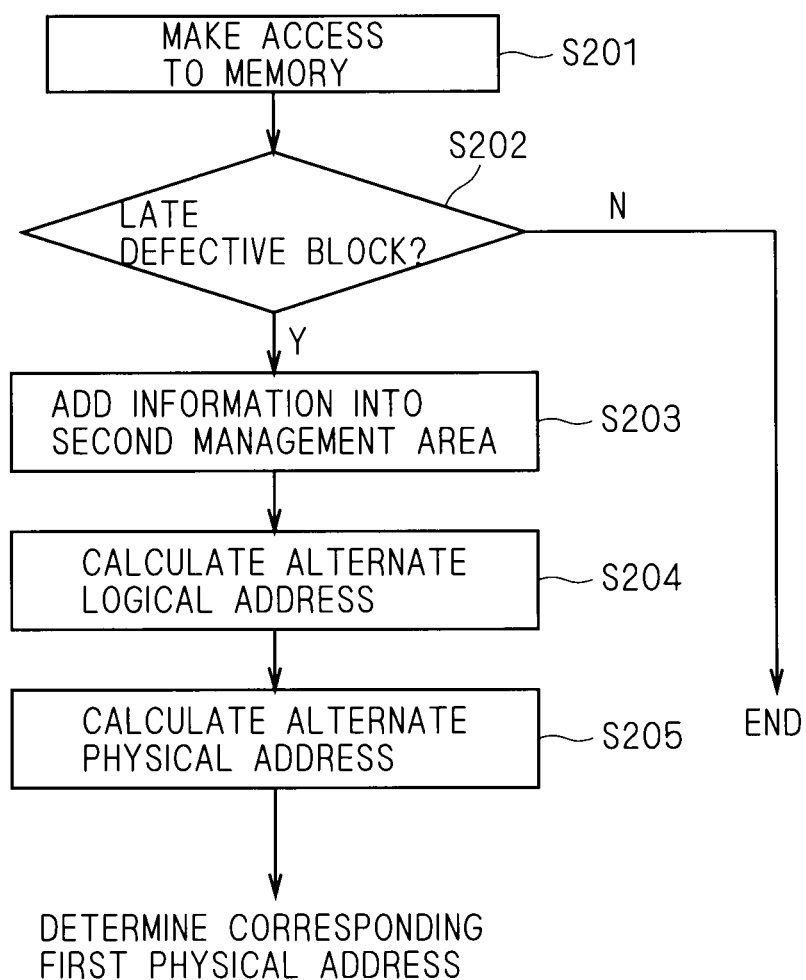
FIG. 15 is a flowchart showing an operation of a logical-physical conversion process in accordance with a second preferred embodiment.

Hereafter, discussion will go on with reference to the flowchart of FIG. 15.

Then, the memory controller 5 makes access to the first physical address PBA17 in the memory 4 according to the above access request (Step S201).

Next, in the second preferred embodiment, the computing device 50 determines if the first block 42 designated by the first physical address PBA17 obtained in Step S101 is a late defective block (specifically, the computing device 50 determines if any late defect occurs in the first block 42 at the above access in Step S202).

Figure 16:
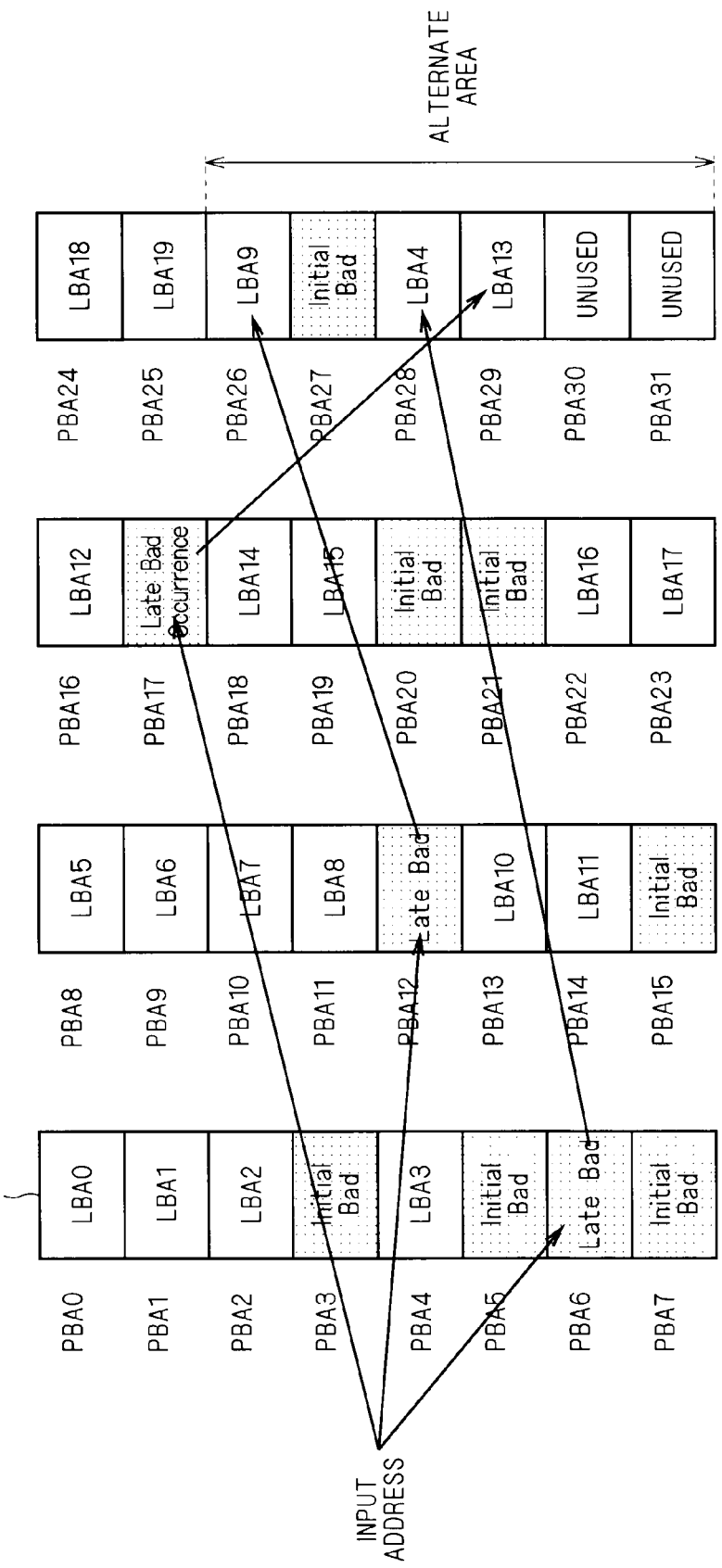
FIG. 16 is a view used for explaining the operation of the logical-physical conversion process in accordance with the second preferred embodiment.

In the second preferred embodiment, as shown in FIG. 16, it is assumed that a late defect occurs in the first block 42 designated by the first physical address PBA17 at the above access. In FIG. 16, for convenience of illustration, in the first block 42 designated by the first physical address PBA17 seen is the letters "Late Bad Occurrence". Therefore, in the second preferred embodiment, the computing device 50 determines that the first block 42 designated by the first physical address PBA17 is a late defective block ("Y" in Step S202). This determination can be performed when the memory controller 5 receives a signal from the memory 4, indicating whether the above access is made normally or not.

Unlike the above, if the computing device 50 determines that the first block 42 designated by the first physical address PBA17 is not a late defective block ("N" in Step S202), the computing device 50 continues the operation on the memory 4 according to the access request.

Figure 17:
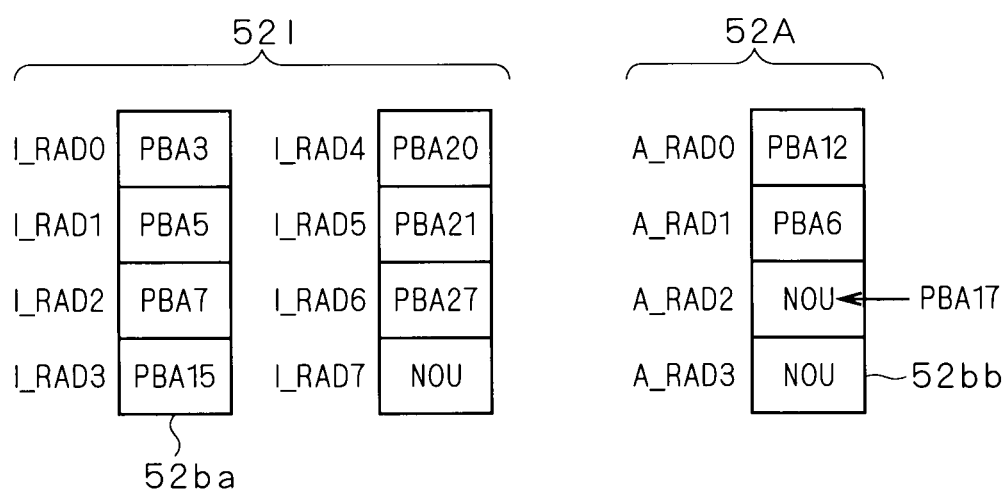
FIG. 17 is a view showing an exemplary structure of information stored in the first management area and the second management area as the reference information.

When the judgment is "Y" in Step S202, as shown in FIG. 17, the computing device 50 records the first physical address PBA 17 obtained in Step S101 into the second management area 52A (Step S203). Herein, at the first and second addresses of the third blocks 52*bb*, i.e., A_RAD0 and A_RAD1, the information of the first physical addresses have been already stored (see FIG. 17). Then, the information of the first physical address PBA17 is recorded into the leading one (A_RAD2) out of the third blocks in which no information of the first physical address is stored (see FIG. 17).

Next, in Step S204, the computing device 50 calculates the alternate logical address from Eq. 11. Also in the second preferred embodiment, like in the case of FIG. 11A, it is assumed that the leading alternate logical address is the address LBA20 and this value is set to the computer 2 and the memory card 3 in advance. Further, the alternate logical offset is uniquely determined to be "2" from the physical address (the third physical address) A_RAD2 of the third block 52*bb* in the second management area 52A in which the first physical address PBA 17 obtained in Step S101 is stored.

Therefore, from Eq. 11, the alternate logical address=LBA20+2, and the computing device 50 obtains LBA22 as the alternate logical address ("22" is the sum of the number "20" of the leading alternate logical address and the value "2" of the alternate logical offset).

Next, the computing device 50 calculates the alternate physical address corresponding to the alternate logical address LBA22 by performing the above first logical-physical conversion (conversion of the alternate logical address, instead of the logical address) using the alternate logical address LBA22 obtained in Step S204 and the information in the first management area 52I of the controller memory 52 (the information stored in the second block 52ba of FIG. 14) (Step S205). Applying the above first logical-physical conversion, the alternate physical address is determined to be "PBA29" (see FIG. 16).

Then, the computing device 50 determines the alternate physical address PBA29 calculated in Step S205 as the first physical address corresponding to the inputted logical address LBA13. After that, the memory controller 5 performs the operation on the determined first physical address PBA29 according to the above access request.

After the operation according to the above access request is completed, during an idle period until the next access request is generated, the memory controller 5 (the computing device 50) transmits the information in the second blocks 52ba constituting the first management area 52I of the controller memory 52 to the first management area (represented by 41A in FIG. 9) constituted of some first blocks 42 of the memory 4. The memory controller 5 (the computing device 50) further transmits the information in the third blocks 52bb constituting the second management area 52A of the controller memory 52 to the second management area (represented by 41B in FIG. 9) constituted of the other first blocks 42 of the memory 4.

After the transmission, the positional relation of the information to be managed and recorded in the first management area 52I is the same as that in the first management area 41A, like in the transmission of the information from the memory 4 to the controller memory 52. Further, after the transmission, the positional relation of the information to be managed and recorded in the second management area 52A is the same as that in the second management area 41B, like in the transmission of the information from the memory 4 to the controller memory 52.

Thus, in the second preferred embodiment, the computing device 50 determines if the first block 42 designated by the first physical address obtained in Step S101 is a late defective block (Step S202).

Therefore, when access is made to the first physical address obtained in Step S101, it is possible to check if any one late defect occurs in the accessed first block 42 and also determine if a further logical-physical conversion should be performed.

In the second preferred embodiment, the computing device 50 records the first physical address obtained in Step S101 into the leading one out of the third blocks 52bb in which no information of the first physical address is stored (Step S203).

Therefore, it is possible to dynamically perform the following logical-physical conversion on the basis of the information in the updated third block 52bb.

In the second preferred embodiment, after Step S203, the computing device 50 obtains the alternate logical address on the basis of the third physical address in the third block 52bb and the leading alternate logical address prepared in advance (herein, LBA20) (Step S204). Then, the computing device 50 obtains the first physical address corresponding to the logical address on the basis of the alternate logical address and the information stored in the second blocks 52ba (Step S205).

Therefore, it is possible to produce the effect discussed in the first preferred embodiment (no need to change the correspondence for logical-physical conversion over a lot of blocks) by an easy method, i.e., by using the information in the updated third block 52bb.

<The Third Preferred Embodiment>

Figure 18:
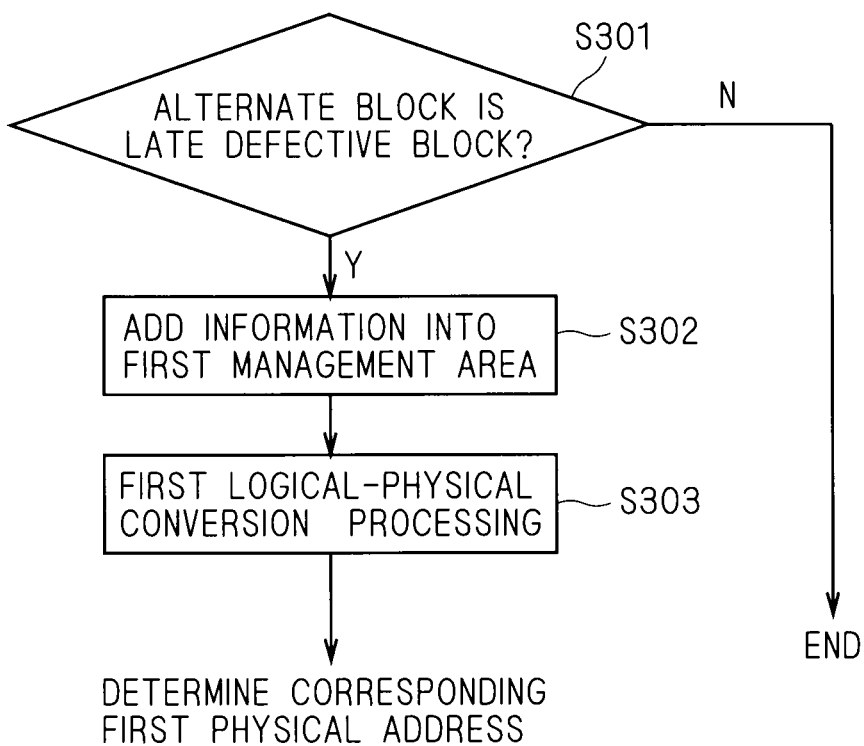
FIG. 18 is a flowchart showing an operation of a logical-physical conversion process in accordance with a third preferred embodiment.

In the first and second preferred embodiments, there is a good possibility that the first block 42 designated by the calculated alternate physical address becomes a late defective block. The third preferred embodiment is achieved in consideration of the above situation. In the second preferred embodiment, the first physical address corresponding to the logical address LBA13 is determined to be "PBA29". The third preferred embodiment will be discussed, taking a case where a late defect occurs at the first physical address "PBA29" as an example. Hereafter, an operation of a logical-physical conversion process in accordance with the third preferred embodiment will be discussed with reference to the flowchart of FIG. 18.

The memory controller 5 makes access to the first physical address PBA29 according to the access request from the computer 2. In the third preferred embodiment, the computing device 50 checks if the first block 42 designated by the first physical address PBA29 which is an alternate physical address is a late defective block (specifically, checks if a late defect occurs in the above first block 42 at the above access in Step S301).

Figure 19:
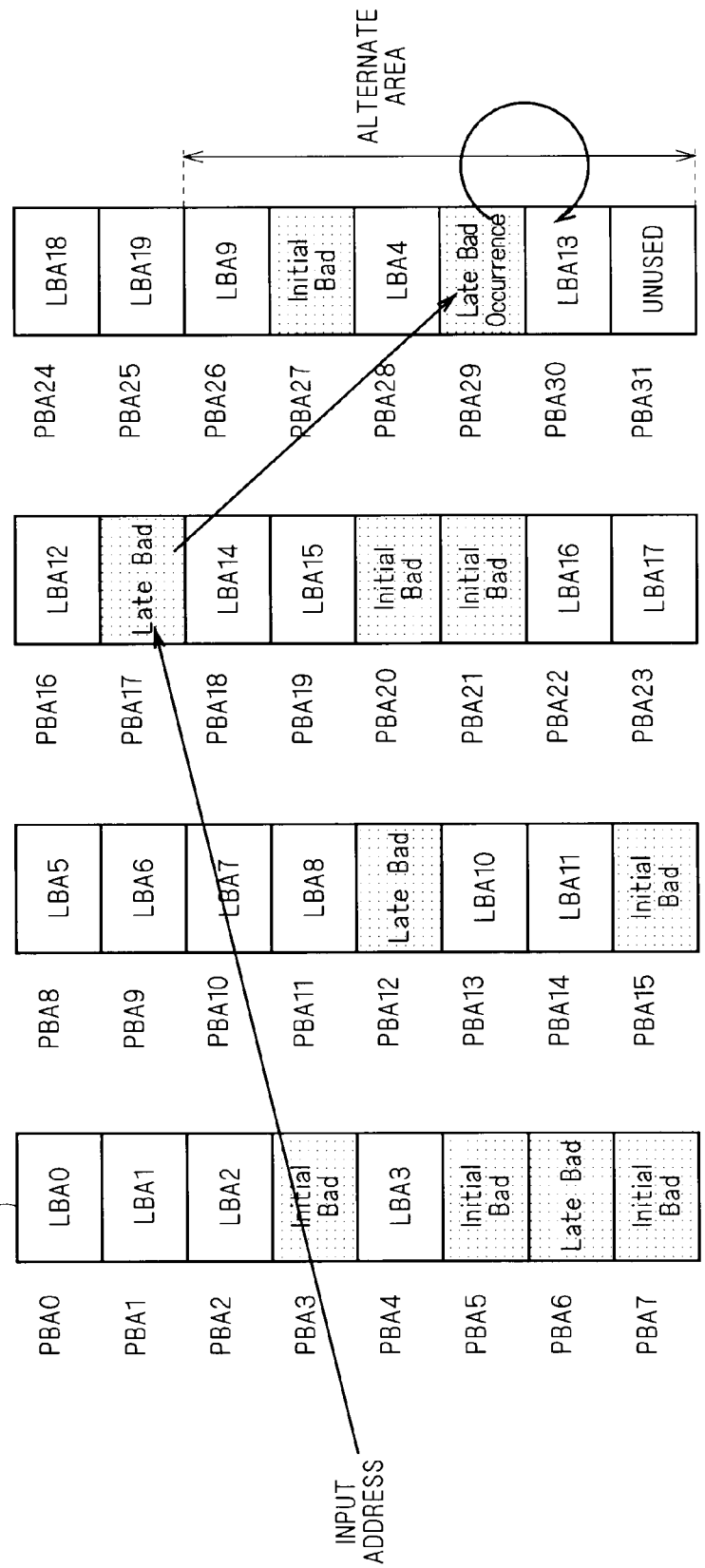
FIG. 19 is a view used for explaining the operation of the logical-physical conversion process in accordance with the third preferred embodiment.

Herein, in the third preferred embodiment, as shown in FIG. 19, it is assumed that a late defect occurs in the first block 42 designated by the first physical address PBA29 at the above access. In FIG. 19, for convenience of illustration, in the first block 42 designated by the first physical address PBA29 seen is the letters "Late Bad Occurrence". Therefore, in the third preferred embodiment, the computing device 50 determines that the first block 42 designated by the first physical address PBA29 is a late defective block ("Y" in Step S301). This determination can be performed when the memory controller 5 receives a signal from the memory 4, indicating whether the above access is made normally or not.

Unlike the above, if the computing device 50 determines that the first block 42 designated by the first physical address PBA29 is not a late defective block ("N" in Step S301), the computing device 50 continues the operation on the memory 4 (the first block 42 designated by the first physical address PBA29) according to the access request.

Figure 20:
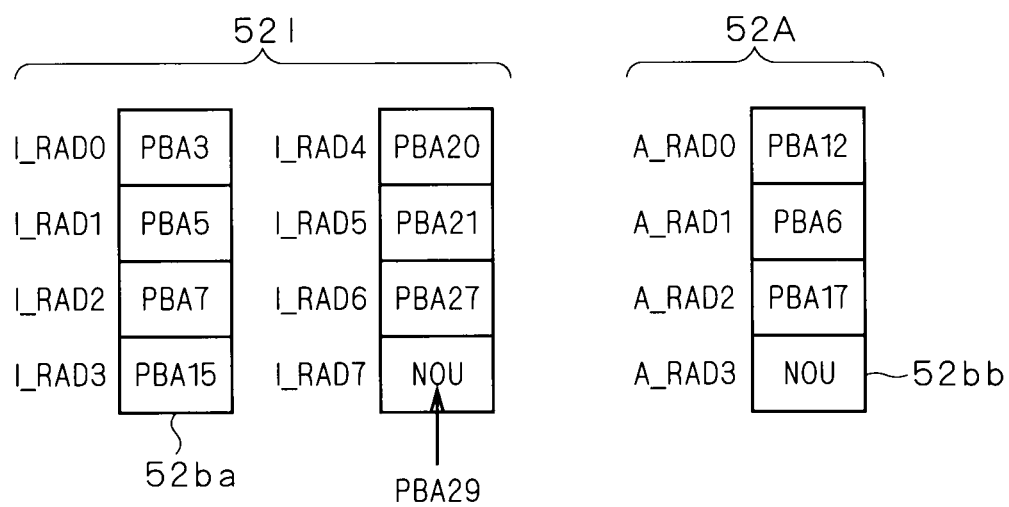
FIG. 20 is a view showing an exemplary structure of information stored in the first management area and the second management area as the reference information.

When the judgment is "Y" in Step S301, as shown in FIG. 20, the computing device 50 records the first physical address PBA29 designating a late defective block into the first management area 52I (Step S302). Herein, the information of the first physical addresses have been already stored in the second blocks 52bb at the addresses from I_RAD0 (the leading address) to I_RAD6 (see FIG. 20). Then, the information of the first physical address PBA29 is recorded into the leading one (I_RAD7) out of the second blocks in which no information of the first physical address is stored (see FIG. 20).

It is noted, herein, that if a late defect occurs in the first block 42 which is once replaced (the first block 42 in the alternate area), the first physical address of the first block 42 which is a late defective block is added and recorded to the first management area 52I, instead of the second management area 52A.

As discussed in the second preferred embodiment, the first block 42 designated by the first physical address PBA29 is a block which has been already replaced because a late defect has occurred in other first block 42. In the first block 42 which is the alternate target, a late defect occurs. Then, the address information of the first physical address PBA29 is added and recorded into the first management area 52I.

Further, in a plurality of first block 42 which are replaced, late defects occur chronologically and the information of the first physical addresses are sequentially recorded into the second blocks from the leading one in which no information of the first physical address has been stored yet, in the order that the late defects occur. With this operation, in the first management area 52I after the recording, the first physical addresses PBA0 to PBA31 are stored in ascending order into the second blocks in ascending order of the second physical addresses I_RAD0 to I_RAD7. Specifically, as discussed above, the first physical addresses PBA26 to PBA31 are recorded into the first management area 52I. This eliminates the necessity of sorting the information stored in the second blocks 52*ba* in ascending order of the second physical addresses I_RAD0 to I_RAD7 so that the first physical addresses PBA0 to PBA31 can be stored in ascending order.

Next, the computing device 50 calculates the alternate physical address corresponding to the alternate logical address LBA22 by performing the above first logical-physical conversion (conversion of the alternate logical address, instead of the logical address) using the alternate logical address LBA22 obtained in Step S204 and the information in the first management area 52I of the controller memory 52 (the information stored in the first management area 52I of FIG. 20 in which the first physical address "PBA29" is recorded, i.e., the information stored in the second block 52*ba*) (Step S303). Applying the above first logical-physical conversion, the alternate physical address is determined to be "PBA30" (see FIG. 19).

Then, the computing device 50 determines the alternate physical address PBA30 calculated in Step S303 as the first physical address corresponding to the inputted logical address LBA13. After that, the memory controller 5 performs the operation on the determined first physical address PBA30 according to the above access request.

Herein, there is a possibility that the first block 42 designated by the alternate physical address PBA30 calculated in Step S303 is further a late defective block. For this reason, it is preferable that Steps S301 to 5303 are repeatedly executed until the first block 42 designated by the calculated alternate physical address is determined to be a normal block.

After the operation according to the above access request is completed, during an idle period until the next access request is generated, the memory controller 5 (the computing device 50) transmits the information in the second blocks 52*ba* constituting the first management area 52I of the controller memory 52 to the first management area (represented by 41A in FIG. 9) constituted of some first blocks 42 of the memory 4. The memory controller 5 (the computing device 50) further transmits the information in the third blocks 52*bb* constituting the second management area 52A of the controller memory 52 to the second management area (represented by 41B in FIG. 9) constituted of the other first blocks 42 of the memory 4.

After the transmission, the positional relation of the information to be managed and recorded in the first management area 52I is the same as that in the first management area 41A, like in the transmission of the information from the memory 4 to the controller memory 52. Further, after the transmission, the positional relation of the information to be managed and recorded in the second management area 52A is the same as that in the second management area 41B, like in the transmission of the information from the memory 4 to the controller memory 52.

The operation of third preferred embodiment has been discussed, being based on the operation of the second preferred embodiment as a premise. The third preferred embodiment, however, may be applied, being based on the first preferred embodiment as a premise. Specifically, the alternate physical address is obtained in accordance with the first preferred embodiment and after that, even if a late defect occurs in the first block 42 designated by the alternate physical address, the third preferred embodiment can be applied (in other words, the flow shown in FIG. 18 can be applied).

Specifically, the computing device 50 checks if the first block 42 designated by the first physical address which is the alternate physical address obtained in Step S104 is a late defective block (Step S301). Then, if the computing device 50 determines that the first block 42 is a late defective block, the computing device 50 records the first physical address obtained in Step S104, which is determined to be a late defective block, into the leading one out of the second blocks 52*ba* in the first management area 52I in which no information of the first physical address is stored (Step S302). The computing device 50 subsequently calculates the alternate physical address corresponding to the alternate logical address by performing the above first logical-physical conversion (conversion of the alternate logical address, instead of the logical address) using the alternate logical address obtained in Step S103 and the information in the first management area 52I of the controller memory 52 (Step S303). Then, the computing device 50 determines the alternate physical address obtained in Step S303 as the first physical address corresponding to the inputted logical address.

Thus, in the third preferred embodiment, the computing device 50 checks if the first block (alternate block) 42 designated by the first physical address obtained in Step S104 or Step S205 has a late defect (Step S301).

Therefore, when access is made to the replaced first block 42, it is possible to check if a late defect occurs in the accessed first block 42 and also possible to determine if a further logical-physical conversion should be performed.

In the third preferred embodiment, the computing device 50 records the first physical address obtained in Step S104 or Step S205 into the leading one out of the second blocks 52*ba* in which no information of the first physical address is stored (Step S302).

Therefore, it is possible to dynamically perform the following logical-physical conversion on the basis of the information in the updated third block 52*bb*.

In the third preferred embodiment, the computing device 50 obtains the first physical address corresponding to the logical address on the basis of the alternate logical address obtained in Step S103 or Step S204 and the information stored in the second blocks 52*ba* after Step S302 (Step S303).

Therefore, it is possible to produce the effect discussed in the first preferred embodiment (no need to change the correspondence for logical-physical conversion over a lot of blocks) by an easy method, i.e., by using the information in the updated second block 52*ba*.

Also in the third preferred embodiment, in like the second preferred embodiment, provided is the computing device (transmission part) 50 for transmitting the information in the second blocks 52*ba* to the first management area 41A constituted of some first blocks 42 and transmitting the information in the third blocks 52*bb* to the second management area 41B constituted of the other first blocks 42.

Therefore, it is possible to store the information in the first blocks 52*ba* and the second blocks 52*bb* in the first management area 41A and the second management area 41B as a backup.

As discussed in the first preferred embodiment, before deriving the first physical address corresponding to the logical address, the computing device (transmission part) 50 transmits the information in the first management area 41A to the second blocks 52*ba* and transmits the information in the second management area 41B to the third blocks 52*bb*.

Therefore, it is possible to transmit, for example, the information stored in the first and second management areas 41A and 41B as a backup to the second blocks 52*ba* and the third blocks 52*bb* in which high-speed computation can be performed by the computing device 50.

While the invention has been shown and described in detail, the foregoing description is in all aspects illustrative and not restrictive. It is therefore understood that numerous modifications and variations can be devised without departing from the scope of the invention.

What is claimed is:

1. A memory card, comprising:
   a plurality of first blocks configured to store user information therein, to which first physical addresses which are not duplicate are assigned, respectively;
   a plurality of second blocks configured to individually store therein said first physical addresses of initial defective blocks out of said plurality of first blocks;
   a plurality of third blocks configured to individually store therein said first physical addresses of late defective blocks out of said plurality of first blocks; and
   a computing device configured to obtain a first physical address corresponding to a logical address on the basis of said logical address, information stored in said second blocks, and information stored in said third blocks, wherein
   said third blocks are assigned third physical addresses which are not duplicate, respectively,
   said first physical addresses of said late defective blocks are stored in said third blocks such that when said third blocks are viewed in ascending order of said third physical addresses, said first physical addresses of said late defective blocks stored in said third blocks are arranged in the order that late defects occur,
   said computing device
   (A) obtains said first physical address corresponding to said logical address on the basis of said logical address and said information stored in said second blocks, and
   (B) determines if said first physical address obtained in said step (A) agrees with any one piece of said information stored in said third blocks, and
   when said computing device determines in said step (B) that said first physical address agrees with one piece of said information stored in said third blocks, said computing device
   (C) obtains an alternate logical address on the basis of said third physical address of said third block which stores therein said first physical address obtained in said step (A) and a leading alternate logical address which is prepared in advance, and
   (D) obtains said first physical address corresponding to said logical address on the basis of said alternate logical address and said information stored in said second blocks.

2. The memory card according to claim 1, wherein
   said second block are assigned second physical addresses which are not duplicate, respectively, and
   said first physical addresses of said initial defective blocks are stored in said second blocks such that when said second blocks are viewed in ascending order of said second physical addresses, said first physical addresses of said initial defective blocks stored in said second blocks are arranged in ascending order of the physical address of the initial defective blocks.

3. The memory card according to claim 1, further comprising:
   a first reserve block configured to store said first physical address of said initial defective block out of said plurality of first blocks;
   a second reserve block configured to store said first physical address of said late defective block out of said plurality of first blocks; and
   a transmission part configured to transmit information stored in said first reserve block to said second block and to transmit information stored in said second reserve block to said third block.

4. The memory card according to claim 2, wherein
   said computing device,
   (F) makes access to a first block of the plurality of first blocks designated by said first physical address obtained in said step (A) and as the result thereof, determines if said first block is said late defective block, and
   (G) records, when said first block is determined to be said late defective block in said step (F), said first physical address obtained in said step (A) into said third block to which a leading third physical address is assigned, said leading third physical address being included in said third physical addresses assigned to said third blocks in which no information of said first physical address is stored.

5. The memory card according to claim 1, wherein
   said computing device
   (J) determines if a first block designated by said first physical address obtained in said step (D) has a defect.

6. The memory card according to claim 5, wherein
   when said computing device determines, in said step (J), that said first block has a defect, said computing device
   (K) records said first physical address obtained in said step (D) into said second block to which a leading second physical address is assigned, said leading second physical address being included in said second physical addresses assigned to said second blocks in which said first physical address is not stored.

7. The memory card according to claim 6, wherein
   said computing device
   (L) obtains said first physical address corresponding to said logical address on the basis of said alternate logical address obtained in said step (C) and information stored in said second block after said step (K).

8. The memory card according to claim 7, further comprising
   a transmission part configured to transmit said information stored in said second blocks to a first management area which is constituted of one part of said plurality of first blocks and to transmit said information stored in said third blocks to a second management area which is constituted of an other part of said plurality of first blocks.

9. A memory card, comprising:
   a plurality of first blocks configured to store user information therein, to which first physical addresses which are not duplicate are assigned, respectively;
   a plurality of second blocks configured to individually store therein said first physical addresses of initial defective blocks out of said plurality of first blocks;
   a plurality of third blocks configured to individually store therein said first physical addresses of late defective blocks out of said plurality of first blocks; and
   a computing device configured to obtain a first physical address corresponding to a logical address on the basis of said logical address, information stored in said second blocks, and information stored in said third blocks, wherein
   said third blocks are assigned third physical addresses which are not duplicate, respectively,
   said first physical addresses of said late defective blocks are stored in said third blocks such that when said third blocks are viewed in ascending order of said third physical addresses, said first physical addresses of said late defective blocks stored in said third blocks are arranged in the order that late defects occur, said second blocks are assigned second physical addresses which are not duplicate, respectively, said first physical addresses of said initial defective blocks are stored in said second blocks such that when said second blocks are viewed in ascending order of said second physical addresses, said first physical addresses of said initial defective blocks stored in said second blocks are arranged in ascending order of the physical address of the initial defective blocks, and said computing device (E) obtains said first physical address corresponding to said logical address on the basis of said logical address and said information stored in said second blocks, (F) makes access to a first block of the plurality of first blocks designated by said first physical address obtained in said step (E) and as the result thereof, determines if said first block is said late defective block, (G) records, when said first block is determined to be said late defective block in said step (F), said first physical address obtained in said step (E) into said third block to which a leading third physical address is assigned, said leading third physical address being included in said third physical addresses assigned to said third blocks in which no information of said first physical address is stored, (H) obtains an alternate logical address on the basis of said third physical address of said third block and a leading alternate logical address which is prepared in advance after said step (G), and (I) obtains said first physical address corresponding to said logical address on the basis of said alternate logical address and said information stored in said second blocks.

10. The memory card according to claim 9, wherein
said computing device
(J) determines if a first block designated by said first physical address obtained in said step (I) has a defect.

11. The memory card according to claim 10, wherein
when said computing device determines, in said step (J), that said first block has a defect, said computing device
(K) records said first physical address obtained in said step (I) into said second block to which a leading second physical address is assigned, said leading second physical address being included in said second physical addresses assigned to said second blocks in which said first physical address is not stored.

12. The memory card according to claim 11, wherein
said computing device
(L) obtains said first physical address corresponding to said logical address on the basis of said alternate logical address obtained in said step (H) and information stored in said second block after said step (K).

13. The memory card according to claim 12, further comprising
a transmission part configured to transmit said information stored in said second blocks to a first management area which is constituted of one part of said plurality of first blocks and to transmit said information stored in said third blocks to a second management area which is constituted of an other part of said plurality of first blocks.

14. The memory card according to claim 9, further comprising
a transmission part configured to transmit said information stored in said second blocks to a first management area which is constituted of one part of said plurality of first blocks and to transmit said information stored in said third blocks to a second management area which is constituted of an other part of said plurality of first blocks.

15. The memory card according to claim 14, wherein
said transmission part transmits said information stored in said first management area to said second blocks and transmits said information stored in said second management area to said third blocks before said computing device derives said first physical address corresponding to said logical address.

16. The memory card according to claim 15, wherein said second blocks and said third blocks are held in a volatile memory.

17. A computer system, comprising:
a computer configured to generate a logical address; and
a memory card which includes:
a memory having a plurality of first blocks provided for storing user information therein, to which first physical addresses which are not duplicate are assigned, respectively;
a controller memory having a plurality of second blocks provided for individually storing therein said first physical addresses of initial defective blocks out of said plurality of first blocks, to which second physical addresses which are not duplicate are assigned, respectively, and a plurality of third blocks provided for individually storing therein said first physical addresses of late defective blocks out of said plurality of first blocks, to which third physical addresses which are not duplicate are assigned, respectively; and
a computing device configured to obtain a first physical address corresponding to said logical address received from said computer on the basis of said logical address, information stored in said second blocks, and information stored in said third blocks, wherein
said third blocks are assigned third physical addresses which are not duplicate, respectively, and
said first physical addresses of said late defective blocks are stored in said third blocks such that when said third blocks are viewed in ascending order of said third physical addresses, said first physical addresses of said late defective blocks stored in said third blocks are arranged in the order that late defects occur,
said computing device
(A) obtains said first physical address corresponding to said logical address on the basis of said logical address and said information stored in said second blocks, and
(B) determines if said first physical address obtained in said step (A) agrees with any one piece of said information stored in said third blocks, and
when said computing device determines in said step (B) that said first physical address agrees with one piece of said information stored in said third blocks, said computing device
(C) obtains an alternate logical address on the basis of said third physical address of said third block which stores therein said first physical address obtained in said step (A) and a leading alternate logical address which is prepared in advance, and
(D) obtains said first physical address corresponding to said logical address on the basis of said alternate logical address and said information stored in said second blocks.

* * * * *